(12) United States Patent
Hagiwara et al.

(10) Patent No.: US 10,094,309 B2
(45) Date of Patent: Oct. 9, 2018

(54) ENGINE DEVICE

(71) Applicants: YANMAR CO., LTD., Osaka-shi, Osaka (JP); Japan Ships Machinery & Equipment Association, Tokyo (JP)

(72) Inventors: Ryoichi Hagiwara, Osaka (JP); Osamu Yamagishi, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 15/248,924

(22) Filed: Aug. 26, 2016

(65) Prior Publication Data

US 2016/0363065 A1 Dec. 15, 2016

Related U.S. Application Data

(63) Continuation of application No. PCT/JP2015/052200, filed on Jan. 27, 2015.

(30) Foreign Application Priority Data

Feb. 26, 2014 (JP) ................. 2014-035830
Feb. 26, 2014 (JP) ................. 2014-035832

(51) Int. Cl.
*F02D 41/00* (2006.01)
*F02D 11/00* (2006.01)
(Continued)

(52) U.S. Cl.
CPC ......... *F02D 41/0007* (2013.01); *B63H 21/17* (2013.01); *B63J 3/04* (2013.01); *F02B 29/0406* (2013.01); *F02B 37/16* (2013.01); *F02D 9/02* (2013.01); *F02D 11/10* (2013.01); *F02D 19/024* (2013.01); *F02D 19/027* (2013.01);
(Continued)

(58) Field of Classification Search
CPC ........ F02D 23/00; F02D 23/005; F02D 23/02; F02D 11/10; F02D 11/105; F02D 41/0007; F02D 41/0027; F02D 41/0002; F02D 41/0097; F02D 41/10; F02D 41/12; F02D 41/401; F02D 2200/0406; F02D 2009/0228; F02D 2700/0246; F02D 2700/0248; F02B 37/16; F02B 2037/162; F02B 27/0273
See application file for complete search history.

(56) References Cited

U.S. PATENT DOCUMENTS 4,387,570 A * 6/1983 Iwamoto ................. F02B 37/18
60/600
4,466,414 A * 8/1984 Yoshimura ............... F02B 29/00
123/564
(Continued)

FOREIGN PATENT DOCUMENTS

JP H03-194136 A 8/1991
JP 4-321719 A 11/1992
(Continued)

*Primary Examiner* — Lindsay Low
*Assistant Examiner* — George Jin
(74) *Attorney, Agent, or Firm* — Norton Rose Fulbright US LLP

(57) ABSTRACT

An engine device executes the control of the opening degree of a main throttle valve when engine load is in a low load area. In contrast, when the engine load is in a medium-to-high load area, the engine device sets the main throttle valve to a predetermined opening degree and executes the control of the opening degree of an air supply bypass valve.

2 Claims, 19 Drawing Sheets

(51) Int. Cl.
*F02D 23/00* (2006.01)
*F02B 37/16* (2006.01)
*F02D 11/10* (2006.01)
*F02B 29/04* (2006.01)
*F02D 9/02* (2006.01)
*F02D 19/02* (2006.01)
*B63J 3/04* (2006.01)
*B63H 21/17* (2006.01)
*F02B 19/12* (2006.01)
*F02M 21/02* (2006.01)
*F02D 29/06* (2006.01)

(52) U.S. Cl.
CPC ......... *F02D 23/00* (2013.01); *F02D 41/0002* (2013.01); *F02D 41/0027* (2013.01); *B63B 2241/22* (2013.01); *F02B 19/12* (2013.01); *F02D 29/06* (2013.01); *F02D 2200/0406* (2013.01); *F02D 2700/0246* (2013.01); *F02M 21/0284* (2013.01); *Y02T 10/144* (2013.01); *Y02T 10/146* (2013.01); *Y02T 10/32* (2013.01); *Y02T 10/42* (2013.01)

(56) References Cited

U.S. PATENT DOCUMENTS

| | | | | |
|---|---|---|---|---|
| 4,565,178 A | * | 1/1986 | Nagase | F02B 29/00 123/564 |
| 4,774,812 A | * | 10/1988 | Hitomi | F02B 33/446 60/601 |
| 5,090,391 A | * | 2/1992 | Sasaki | F02B 39/12 123/559.3 |
| 5,150,693 A | * | 9/1992 | Ohnaka | F02B 33/38 123/559.3 |
| 2005/0132705 A1 | | 6/2005 | Boley et al. | |
| 2006/0266033 A1 | * | 11/2006 | Negishi | F02D 41/0007 60/602 |
| 2009/0222188 A1 | * | 9/2009 | Igarashi | F02B 37/16 701/102 |
| 2009/0260603 A1 | * | 10/2009 | Bucknell | F02B 33/34 123/564 |
| 2010/0077993 A1 | * | 4/2010 | Satterfield | F02M 13/00 123/439 |
| 2013/0333665 A1 | * | 12/2013 | Pursifull | F02B 37/04 123/399 |
| 2014/0298805 A1 | * | 10/2014 | Takayanagi | F02D 21/08 60/605.2 |
| 2015/0219024 A1 | * | 8/2015 | Kurashima | F02B 27/0273 123/321 |

FOREIGN PATENT DOCUMENTS

| | | |
|---|---|---|
| JP | 2000-145516 A | 5/2000 |
| JP | 2003-262139 A | 9/2003 |
| JP | 2005-069097 A | 3/2005 |
| JP | 2007-71136 A | 3/2007 |
| JP | 2008-215130 A | 9/2008 |
| JP | 2014-156857 A | 8/2014 |
| WO | 2013/164987 A1 | 11/2013 |

\* cited by examiner

FIG.17
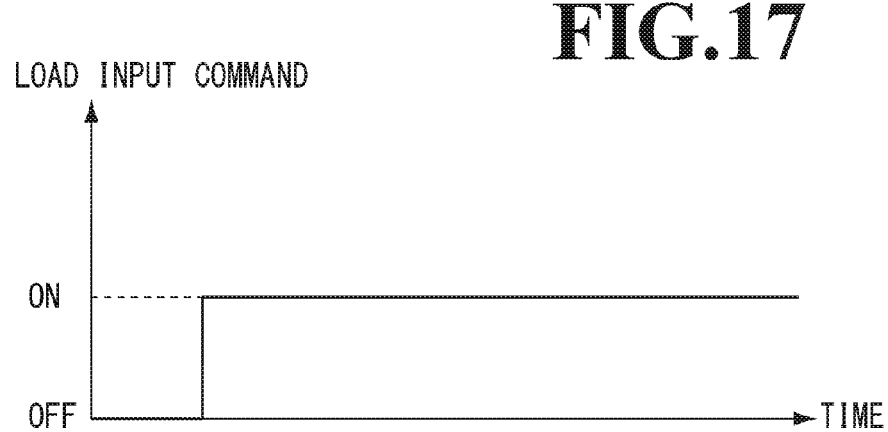
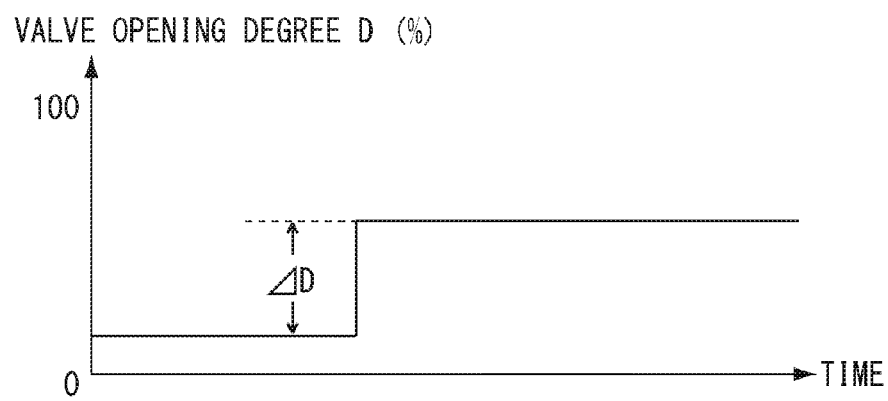
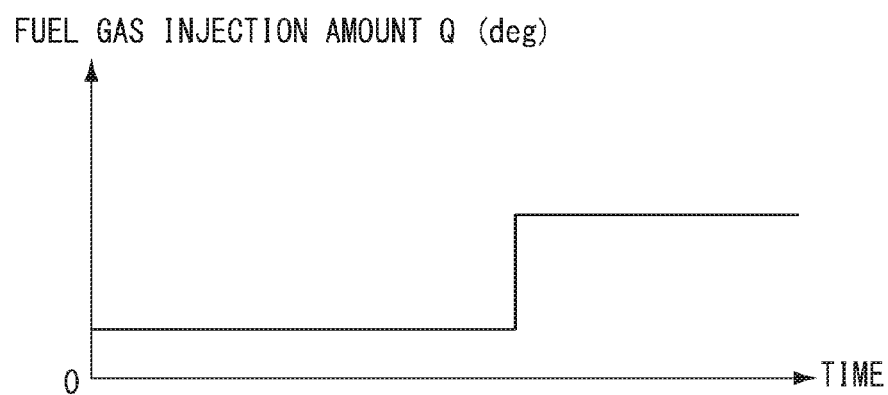

FIG.19
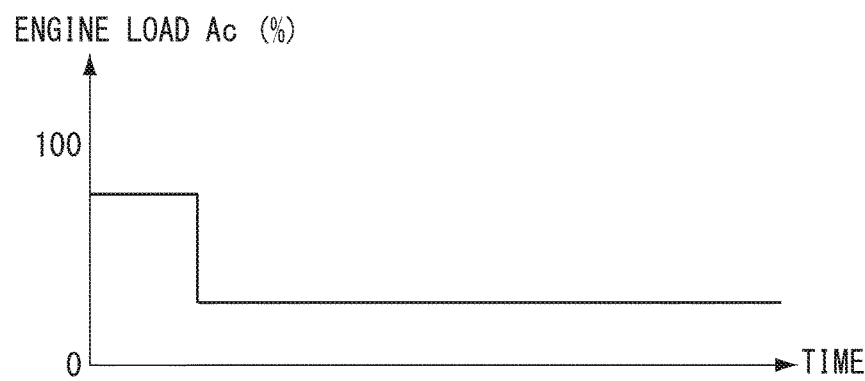
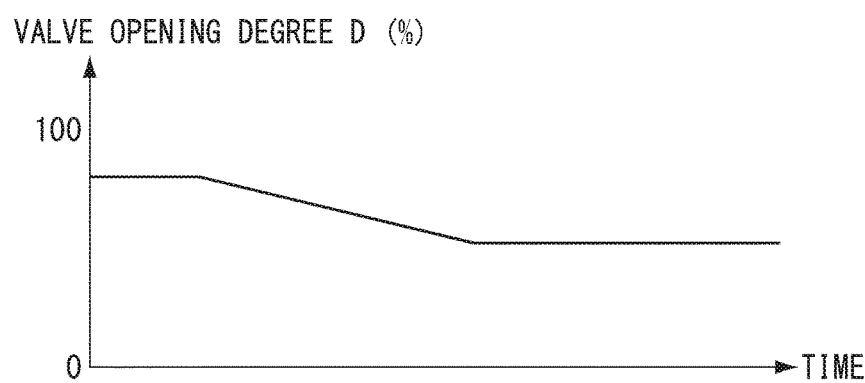
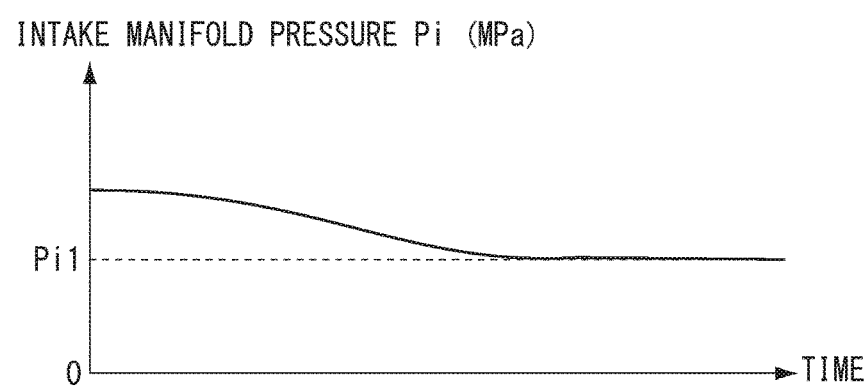

ENGINE DEVICE

CROSS-REFERENCE TO RELATED APPLICATIONS

The present application is a continuation application of International Application No. PCT/JP2015/52200, filed Jan. 27, 2015, which claims priority to Japanese Patent Application No. 2014-035830, filed Feb. 26, 2014 and Japanese Patent Application No. 2014-035832, filed Feb. 26, 2014. The contents of these applications are incorporated herein by reference in their entirety.

BACKGROUND OF THE INVENTION

The present invention of the instant application relates to an engine device.

Conventionally, for example, regarding ships such as tankers and transport vessels or power generation facilities on land, diesel engines have been utilized as the driving source thereof. However, much of toxic substances such as nitride oxides, sulfur oxides, particulate matter, which are impediments to environmental preservation, are included in the exhaust gas of the diesel engine. Accordingly, in recent years, gas engine devices and the like, which can reduce emissions of toxic substances, have been widespread as engines substituted for the diesel engines.

Regarding what is called the gas engine devices that generate motive power by use of fuel gas such as natural gas, mixed gas in which air is mixed with the fuel gas is supplied to cylinders and combusted (see Japanese Unexamined Patent Application Publication No. 2003-262139). In the gas engine disclosed in Japanese Unexamined Patent Application Publication No. 2003-262139, the fuel gas is mixed with air compressed by a supercharger and supplied to the cylinders. Regarding the aforementioned gas engine devices, a throttle valve is provided between the supercharger and an intake manifold for drawing air into the cylinders, and the opening degree of the throttle valve is controlled, thereby adjusting an air-to-fuel ratio.

SUMMARY OF THE INVENTION

Incidentally, in the gas engine devices of this sort, for example, when a gas engine is brought into no-load state due to some factor, and, in step of this, the output of the engine is rapidly reduced, the opening degree of the throttle valve is rapidly reduced (the throttle valve is rapidly closed and actuated). Subsequently, the supercharging pressure of the compressor of the supercharger is abnormally increased, surging (pulsation) occurs in the supercharger due to partial reverse current. The pressure of the compressor gets out of balance due to the occurrence of the surging, and abnormality (enrichment) occurs in an air-to-fuel ratio that is a ratio of intake air mass to fuel mass, which leads to abnormal combustion in the gas engine.

Also when load is switched from low load to high load, a delay occurs at a timing in increasing the amount of intake air inflow based on control of the opening degree of the throttle valve with respect to a timing in increasing the injection amount of fuel gas by means of gas injectors. Accordingly, when the high load is applied, the responsiveness of air flow rate control based on the control of the opening degree of the throttle valve is not good, which leads to shortages in terms of the amount of intake air inflow, and therefore there is a risk that abnormal combustion occurs due to the abnormality (enrichment) of the air-to-fuel ratio.

Accordingly, it is an object of the present invention of the instant application to provide an engine device, in which improvements are provided in the light of the current circumstances.

The present invention according to a first aspect of the invention is such that an engine device includes an intake manifold that supplies air in a cylinder, an exhaust manifold that discharges exhaust gas from the cylinder, a gas injector that mixes the air supplied from the intake manifold with fuel gas, a supercharger that compresses the air by means of the exhaust gas from the exhaust manifold, and an intercooler that cools the compressed air compressed with the supercharger and supplies the compressed air to the intake manifold, and a main throttle valve is provided on a connection section between an air discharge port of the supercharger and an inlet of the intercooler, and an air supply bypass flow path configured to connect the air inflow port of the supercharger with the inlet of the intercooler is provided, and a bypass valve is arranged in the air supply bypass flow path, and when load of the engine is lower than a predetermined threshold value, an opening degree of the main throttle valve is controlled, and a flow rate of air is set in accordance with the load of the engine, whereas when the load of the engine is equal to or higher than a predetermined threshold value, the main throttle valve is set to a predetermined opening degree, and an opening degree of the bypass valve is controlled, and the flow rate of the air is set in accordance with the load of the engine.

Regarding the engine device according to the first aspect, the present invention according to a second aspect thereof may be such that the engine device further includes a pressure sensor configured to measure air pressure in the intake manifold, a load detection sensor configured to detect the load of the engine, an engine control portion configured to control the respective opening degrees of the main throttle valve and the bypass valve, and the engine control portion sets the opening degree of the main throttle valve or the bypass valve based on a difference between target air pressure based on the engine load detected by the load detection sensor and measurement pressure detected by the pressure sensor.

Regarding the engine device according to the second aspect thereof, the present invention according to a third aspect thereof may be such that the engine device further includes an engine revolution sensor configured to measure revolutions of the engine, and the engine control portion sets a fuel injection amount from the gas injector based on the engine revolutions detected by the engine revolution sensor and sets the opening degree of the main throttle valve or the bypass valve based on the fuel injection amount set and an air-to-fuel ratio determined based on and the engine load.

Regarding the engine device according to the first aspect thereof, the present invention according to a fourth aspect thereof may be such that when the engine load increases, and when the engine load is lower than a first threshold value, control of the opening degree of the main throttle valve is executed, and when the engine load exceeds the first threshold value, the control of the opening degree of the main throttle valve is switched to control of the opening degree of the bypass valve, whereas when the engine load decreases, and when the engine load is equal to or higher than a second threshold value that is lower than the first threshold value, the control of the opening degree of the bypass valve is executed, and when the engine load falls below the second threshold value, the control of the opening degree of the bypass valve is switched to the control of the opening degree of the main throttle valve.

According to the embodiment of the present invention of the instant application, the engine device includes the intake manifold that supplies the air in the cylinder, the exhaust manifold that discharges the exhaust gas from the cylinder, the gas injector that mixes the air supplied from the intake manifold with the fuel gas, the supercharger that compresses the air by means of the exhaust gas from the exhaust manifold, and the intercooler that cools the compressed air compressed with the supercharger and supplies the compressed air to the intake manifold, and the main throttle valve is provided on the connection section between the air discharge port of the supercharger and the inlet of the intercooler, and the air supply bypass flow path configured to connect the air inflow port of the supercharger with the inlet of the intercooler is provided, and the bypass valve is arranged in the air supply bypass flow path, and when the load of the engine is lower than a predetermined threshold value, the opening degree of the main throttle valve is controlled, and the flow rate of the air is set in accordance with the load of the engine, whereas when the load of the engine is equal to or higher than a predetermined threshold value, the main throttle valve is set to a predetermined opening degree, and the opening degree of the bypass valve is controlled, and the flow rate of the air is set in accordance with the load of the engine, so that based on the structure in which the main throttle valve and the bypass valve are provided, the flow rate of air in the intake manifold can be controlled with high accuracy, and the flow rate of the air can be controlled with excellent responsiveness with respect to variation in load. The air supply bypass flow path functions as a buffer flow path with respect to the supercharger and the intake manifold, so that a response speed by which the flow rate of the air is optimally set in accordance with an increase or decrease in load can be increased by controlling the opening degree of the bypass valve. In particular, in the high load area on which variation in load exerts great influence, the bypass valve control with excellent responsiveness is executed, so that the severe deficiency of the flow rate of the air with respect to the variation on load is unlikely to occur, and an optimal air-to-fuel ratio can be set.

Also, the engine device further includes the pressure sensor configured to measure air pressure in the intake manifold, the load detection sensor configured to detect the load of the engine, the engine control portion configured to control the respective opening degrees of the main throttle valve and the bypass valve, and the engine control portion sets the opening degree of the main throttle valve or the bypass valve based on a difference between target air pressure based on the engine load detected by the load detection sensor and measurement pressure detected by the pressure sensor, so that the target pressure is set in accordance with the detected load, the valve opening degree is controlled based on the feedback control, which makes it possible to provide an appropriate flow rate of the air with respect to the actual load. Accordingly, the optimal air-to-fuel ratio can be set with excellent responsiveness with respect to the variation on load.

Also, according to the embodiment of the present invention, the flow rate of the air supplied to the intake manifold is set, and the flow rate of the air passing through the main throttle valve can be optimally controlled, so that the deficiency of the flow rate of the air supplied to the intake manifold can be prevented. Accordingly, the flow rate of the air can be controlled with excellent responsiveness with respect to a rapid increase in load, which makes it possible to provide an appropriate air-to-fuel ratio, and the operations of the engine device can be stabilized.

Also, according to the embodiment of the present invention, when the engine load is decreased, the engine control portion executes the control of the opening degree of the bypass valve, the flow rate of the air supplied from the intake manifold is set, and when load is reduced, the bypass valve as well as the main throttle valve can be simultaneously controlled, so that the air pressure in the air inlet and outlet ports of the supercharger can be stabilized, and the occurrence of the surging can be prevented.

In particular, according to the embodiment of the present invention, when the engine load increases, and when the engine load is lower than the first threshold value, the control of the opening degree of the main throttle valve is executed, and when the engine load exceeds the first threshold value, the control of the opening degree of the main throttle valve is switched to control of the opening degree of the bypass valve, whereas when the engine load decreases, and when the engine load is equal to or higher than the second threshold value that is lower than the first threshold value, the control of the opening degree of the bypass valve is executed, and when the engine load falls below the second threshold value, the control of the opening degree of the bypass valve is switched to the control of the opening degree of the main throttle valve, and based on the structure in which the main throttle valve and the bypass valve are provided, the flow rate of the air in the intake manifold can be controlled with higher accuracy, so that the flow rate of the air can be controlled with much more excellent responsiveness with respect to variation in load. Furthermore, hysteresis is provided for the threshold values for the purpose of the switching of control, thereby smoothly executing the switching of control.

BRIEF DESCRIPTION OF THE DRAWINGS

FIG. 17 is a time chart illustrating the operation of the control by means of the engine control device when the load is applied;

FIG. 19 is a time chart illustrating the operation of the control of the opening degree of the main throttle valve when the load is reduced.

DESCRIPTION OF THE EMBODIMENTS

Hereinafter, an embodiment in which the preset invention of the instant application is embodied will be described based on drawings in the case where the embodiment is applied to a power generation mechanism mounted on an electric prolusion ship.

Figure 1:
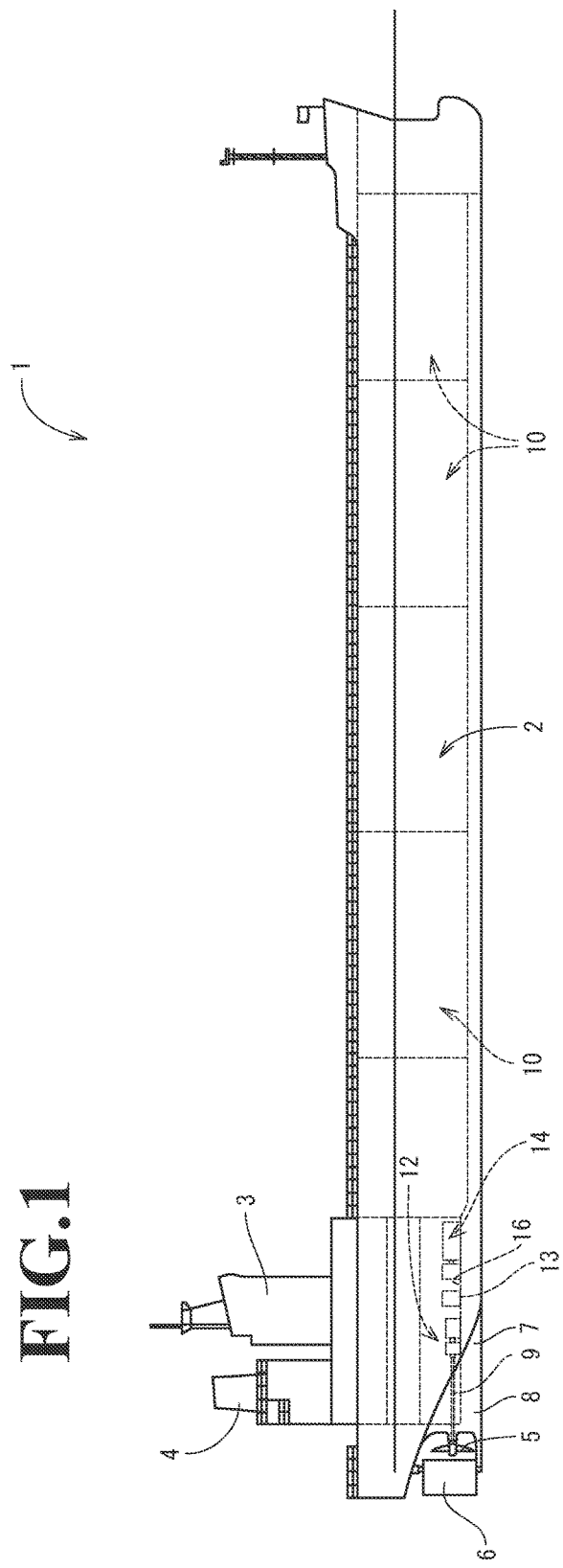
FIG. 1 is a side view of the whole of a ship of the embodiment of the present invention.
Figure 2:
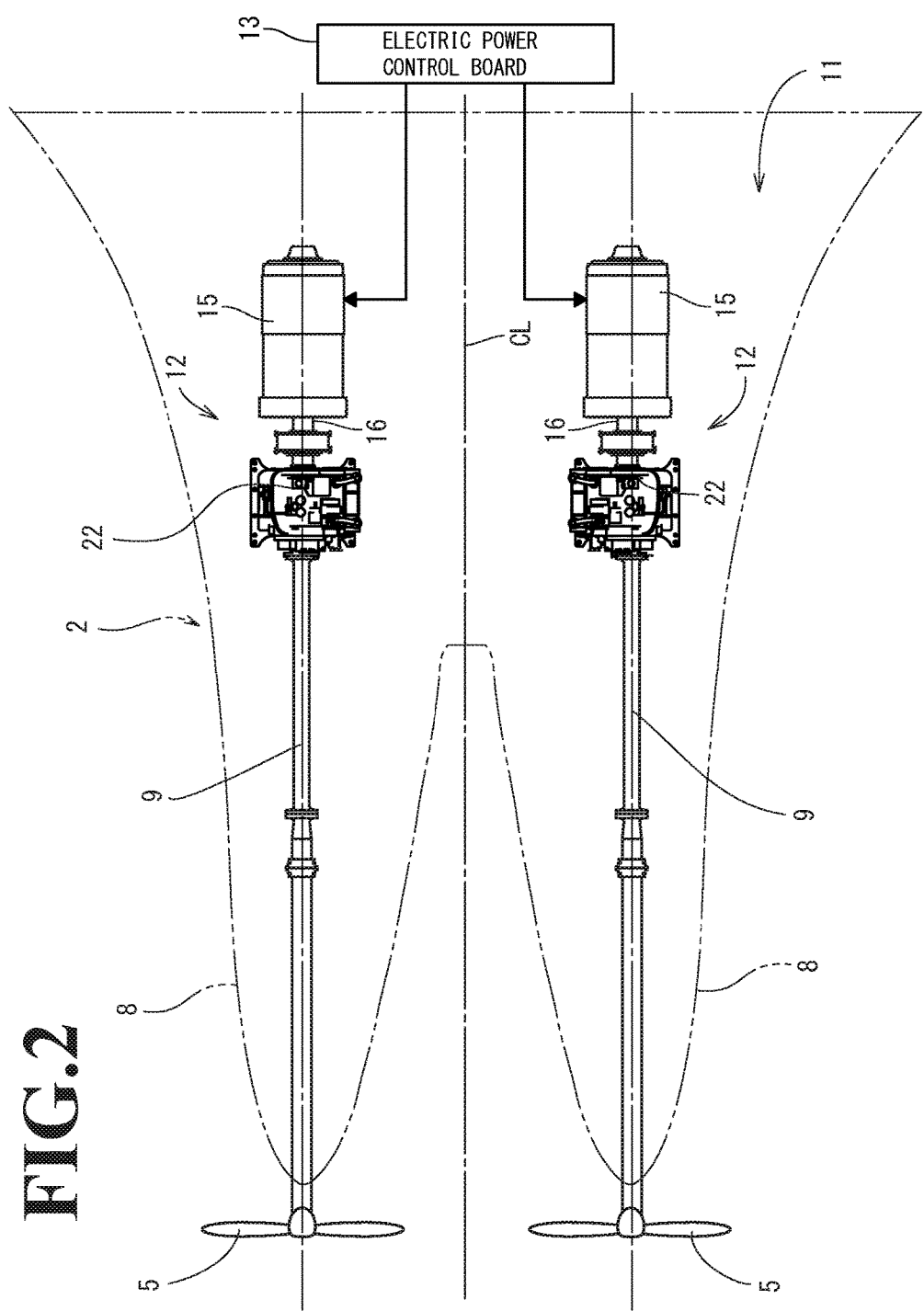
FIG. 2 is an explanatory plan view of an engine room.
Figure 3:
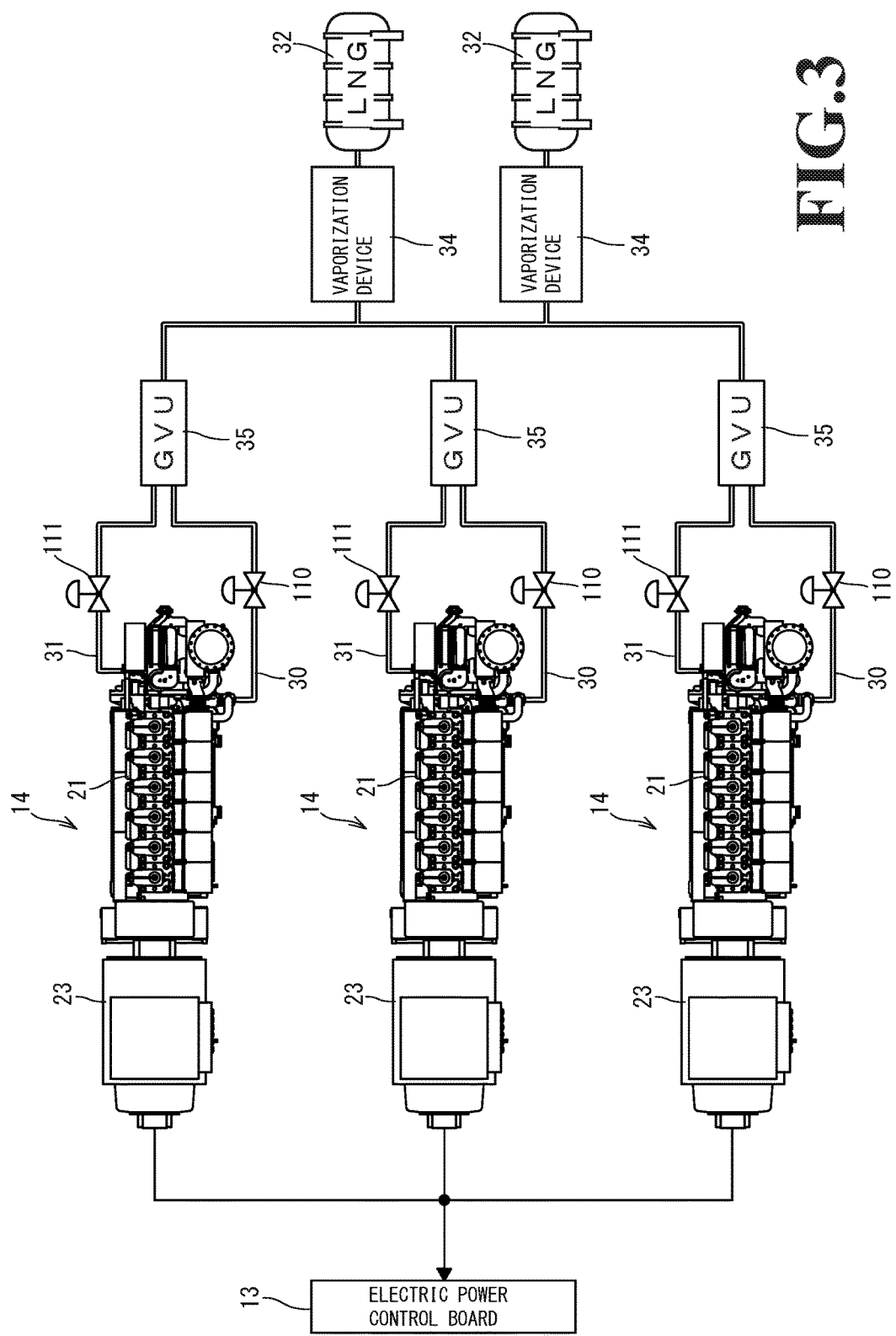
FIG. 3 is an explanatory plan view of the engine room.

To begin with, the outline of the ship will be described. As illustrated in FIGS. 1 to 3, a ship 1 of the present embodiment includes a hull 2, a cabin 3 (bridge) provided on the side of the stern of the hull 2, a funnel 4 (smokestack) arranged in rear of the cabin 3, a pair of propellers 5 provided on the lower portion in rear of the hull 2, and a rudder 6. In this case, a pair of skegs 8 is integrally formed on a ship bottom 7 on the side of the stern. A propeller shaft 9 for drivingly rotating the propeller 5 is pivotally supported on each skeg 8. The skegs 8 are symmetrically formed with reference to a hull center line CL (see FIG. 3) that divides the hull 2 in the right-and-left width direction. That is, in the first embodiment, twin skegs are employed as a shape of the stern of the hull 2.

A hatch 10 is provided on the side of the bow and the central portion in the hull 2, and an engine room 11 is provided on the side of stern in the hull 2. A pair of propulsion mechanisms 12 that serves as a drive source of the propellers 5 is allocated in the right and left with the hull center line CL sandwiched therebetween and arranged in the engine room 11. Each propeller 5 is drivingly rotated by means of rotational power transmitted from each propulsion mechanism 12 to the propeller shaft 9. An electric power control board 13 for controlling the supply of electric power to each propulsion mechanism 12 and a plurality (three units in the present embodiment) of power generation mechanisms 14 for generating electric power supplied through the electric power control board 13 are provided in the engine room 11. The interior of the engine room 11 is vertically partitioned with a deck and an inner bottom plating. The propulsion mechanisms 12, the electric power control board 13, the power generation mechanisms 14 of a first embodiment are installed on the inner bottom plate disposed at the lowermost level of the engine room 11. It is noted that, although not described in detail, the hatch 10 is divided into plural compartments.

As illustrated in FIGS. 2 and 3, the propulsion mechanisms 12 are of a combination of a propulsion motor device 15 (dual fuel engine in the present embodiment), which is the driving source for the propellers 5, and a reducer 22 for transmitting the motive power of the propulsion motor device 15 to the propeller shaft 9. Also, the power generation mechanisms 14 are of a combination of a generator 23 for generating electric power to be supplied and a medium-speed engine device 21, which is the driving source for the generator 23. Herein, "medium-speed" engine means an engine that is driven at a rotational speed approximately from 500 to 1000 revolutions per minute. Incidentally, the engine at "low speed" is driven at a rotational speed that is equal to or less than 500 revolutions per minute, and the engine at "high speed" is driven at a rotational speed that is equal to or higher than 1000 revolutions per minute. The engine device 21 of the embodiment is configured to be driven at a constant speed within the range of medium speeds (approximately 700 to 750 revolutions per minute).

The rear end side of an engine output shaft 24 protrudes from the rear surface side of the engine device 21. The generator 23 is coupled with the rear end side of the engine output shaft 24 in such a manner that the motive power can be transmitted. In the power generation mechanisms 14, the generator 23 is drivingly rotated with the engine device 21, which allows the generator 23 to transmit the generated electric power to the electric power control board 13. The electric power control board 13 supplies part of the electric power transmitted from each generator 23 to the propulsion motor device 15, and the propulsion motor device 15 is drivingly rotated. Also, the electric power control board 13 supplies the electric power generated by each generator 23 to an electric system in the hull 2 except for the propulsion motor device 15.

In the propulsion motor device 15, the motive power of the propulsion motor device 15 that is drivingly rotated is transmitted from the rear end side of a motor output shaft 16 to the propeller shaft 9 via the reducer 22 based on the electric power from the electric power control board 13. Part of the motive power of the propulsion motor device 15 is decelerated with the reducer 22 and transmitted to the propeller shaft 9. The propeller 5 is drivingly rotated with the decelerated motive power from the reducer 22. It is noted that a variable pitch propeller that can adjust the speeds of the ship by changing the blade angle of a propeller blade is employed for the propeller 5.

Figure 4:
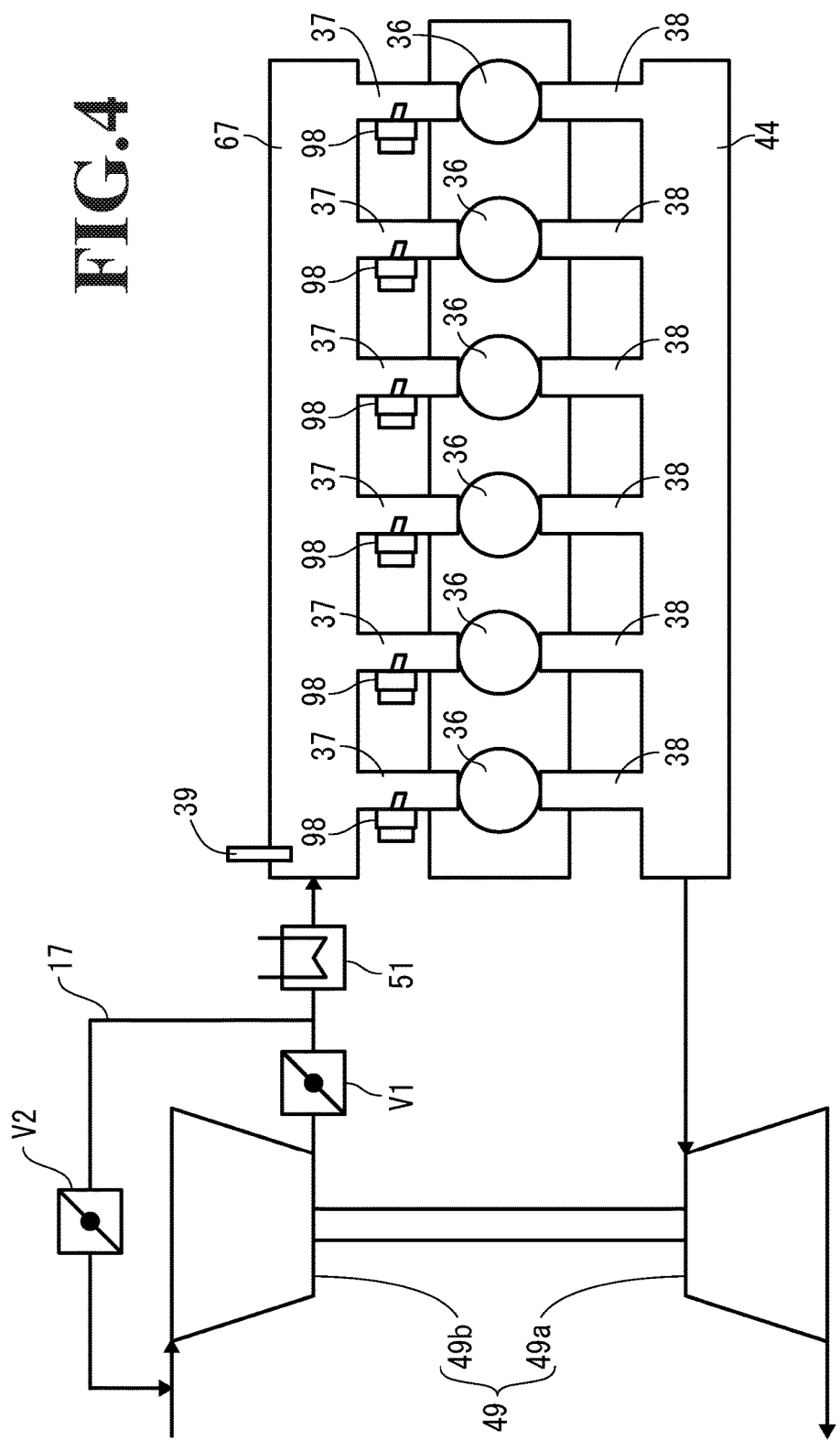
FIG. 4 is a schematic view illustrating the constitution of intake and exhaust paths of an engine device of the embodiment of the present invention.
Figure 5:
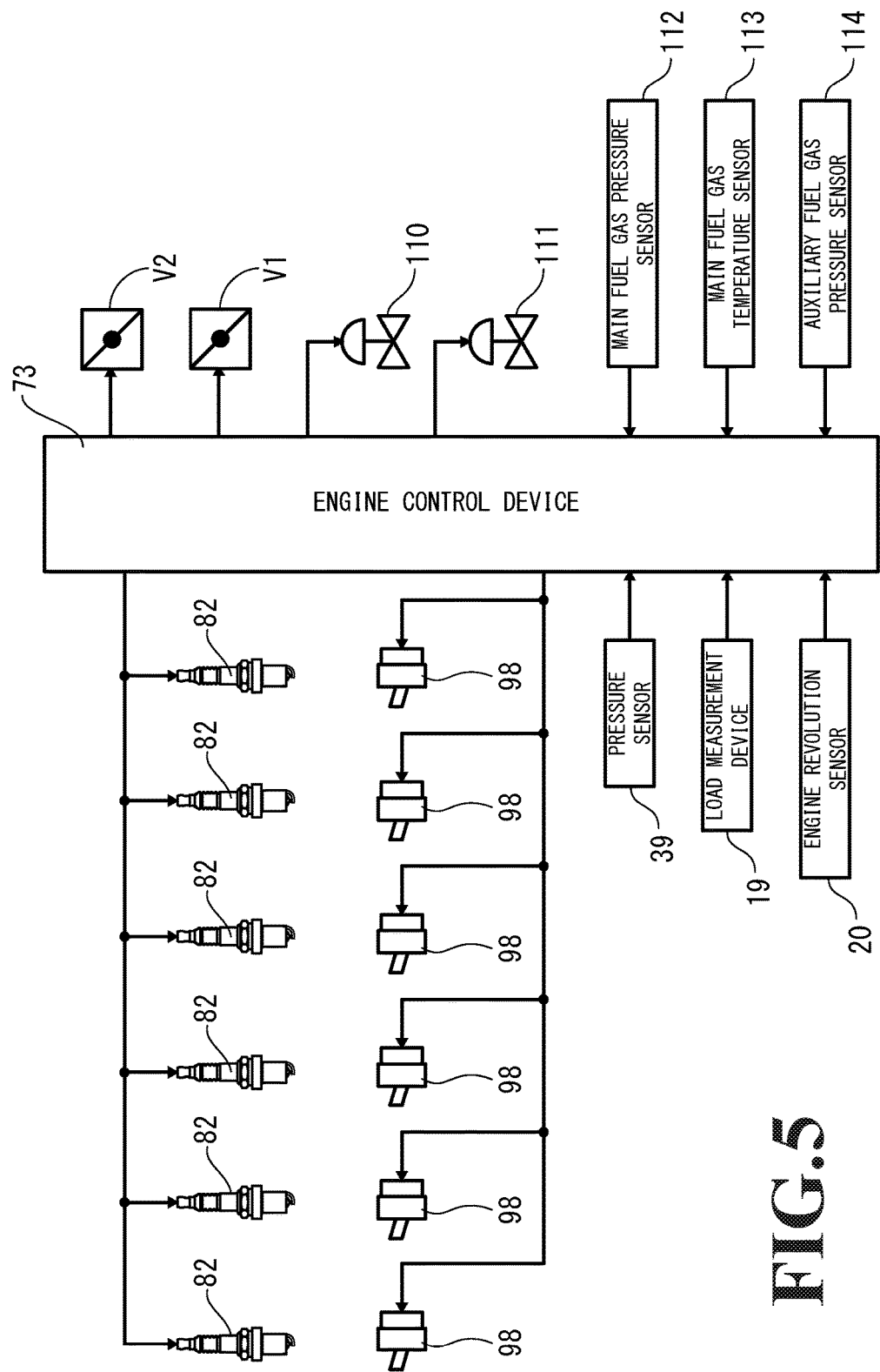
FIG. 5 is a schematic view schematically illustrating the interior of a cylinder head of the engine device.
Figure 6:
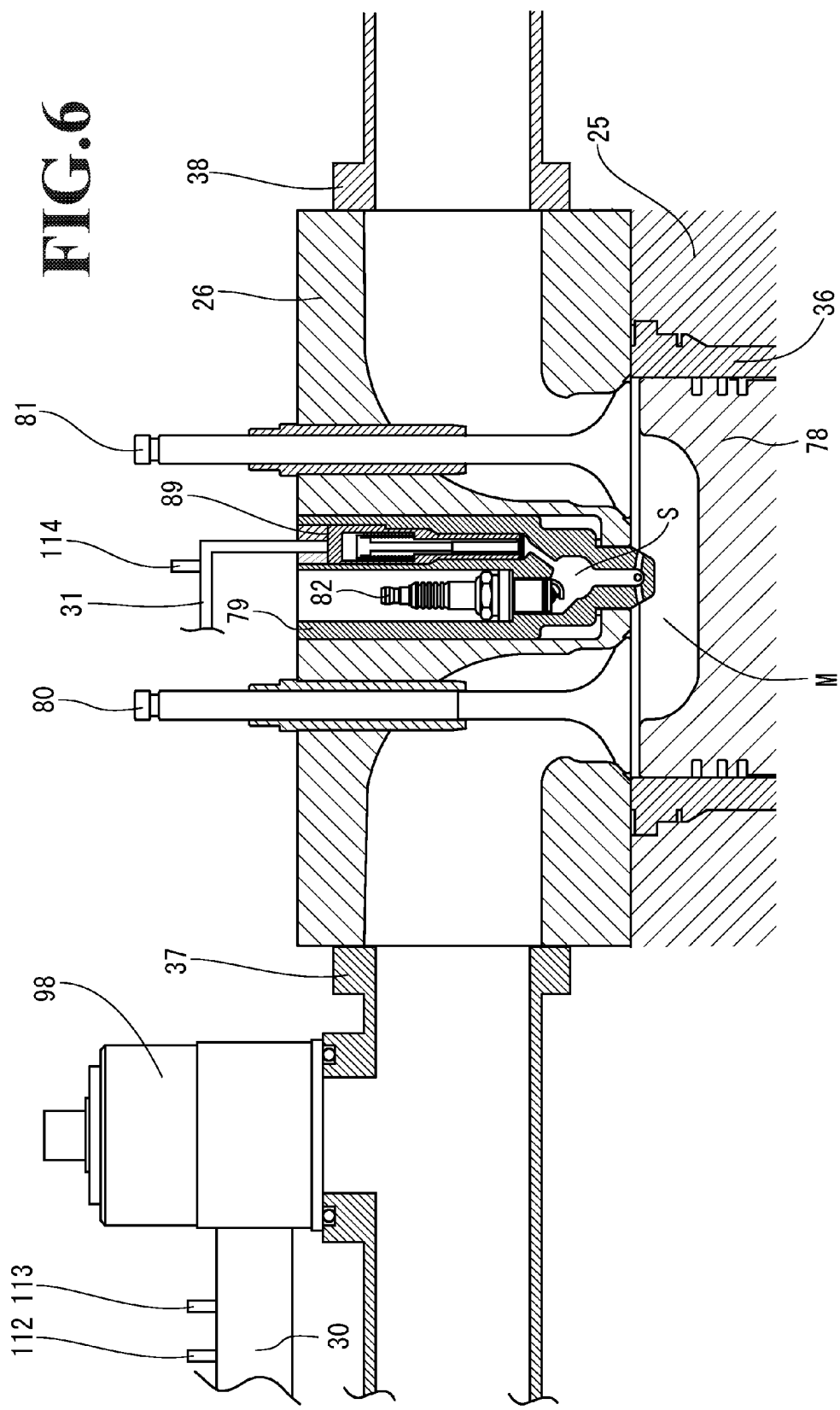
FIG. 6 is a control block diagram of the engine device.

Next, the constitution of a gas engine device, which is the engine device used as the power generation mechanism 14 in the ship 1 will be described referring to FIGS. 3 to 9. A gas engine device 21 (hereinafter merely referred to as "engine device 21") is driven by a premix combustion method in which fuel gas such as natural gas is mixed with air and combusted. FIG. 4 is a view illustrating an air intake and exhaust system in the engine device 21, and FIG. 5 is a schematic view schematically representing the interior of a cylinder head of the engine device 21, and FIG. 6 is a control block diagram of the engine device 21.

As illustrated in FIG. 3, the engine device 21 is connected to a gas fuel tank 32 provided in the ship 2 via a vaporization device 34 and a gas valve unit 35, which constitutes a fuel gas supply path. The gas fuel tank 32 stores liquefied fuel gas, which is obtained by liquefying fuel gas as a gaseous body. The vaporization device 34 vaporizes liquefied fuel (fuel gas) in the gas fuel tank 32 and transmits the vaporized gas to the engine device 21 via the gas valve unit 35. It is noted that part of fuel gas that returns from the engine device 21 is collected in the gas valve unit 35, and the leakage of gas is checked by detecting the gas pressure in the unit.

The engine device 21 is connected to the gas valve unit 35 through a main fuel gas flow path 30 and an auxiliary fuel gas flow path 31. The main fuel gas flow path 30 includes a main fuel gas pressure adjustor 110, and the gas pressure of the fuel gas supplied from the gas valve unit 35 to the engine device 21 is adjusted with the main fuel gas pressure adjustor 110. The main fuel gas flow path 30 includes the main fuel gas pressure adjustor 110, and the gas pressure of the fuel gas supplied from gas injectors 98 (see FIG. 4) described later to a main chamber M (see FIG. 6) is adjusted by means of the main fuel gas pressure adjustor 110. Also, the auxiliary fuel gas flow path 31 includes an auxiliary fuel gas pressure adjustor 111, and the gas pressure of the fuel gas supplied from a check valve 89 (see FIG. 6) described later to an auxiliary chamber S (see FIG. 6) is adjusted with the auxiliary fuel gas pressure adjustor 111.

As illustrated in FIG. 4, the engine device 21 has constitution in which a plurality of cylinders (cylinders) 36 (six cylinders in the present embodiment) are arranged in series on a cylinder block 25 described later. Each cylinder 36 communicates with an intake manifold (intake flow path) 67 constituted in the cylinder block 25 via an intake port 37. Each cylinder 36 communicates with an exhaust manifold (exhaust flow path) 44 arranged above a cylinder head 26 described later via an exhaust port 38. The gas injector 98 is arranged on the intake port 37 of each cylinder 36.

Accordingly, air from the intake manifold 67 is supplied to each cylinder 36 via the intake port 37 while exhaust gas from each cylinder 36 is discharged to the exhaust manifold 44 via the exhaust port 38. The fuel gas is supplied from the gas injector 98 to the intake port 37, and the fuel gas is mixed with the air from the intake manifold 67, and premixed gas is supplied to each cylinder 36. Also, an intake manifold pressure sensor 39 for measuring the pressure of air in the intake manifold 67 is arranged in the intake manifold 67.

It is noted that, in the present embodiment, the amount of air in the intake manifold 67 is determined by the pressure of the intake manifold, but not limited to this. For example, it may be such that the flow rate of air supplied to the intake manifold 67 is detected by a massflow meter or an orifice flowmeter, and the detected air flow rate is regarded as the amount of air in the intake manifold 67.

The exhaust inlet of the turbine 49a of a supercharger 49 is connected to the exhaust outlet side of the exhaust manifold 44, and the air discharge port (fresh air outlet) of an intercooler 51 is connected to the air inlet side (fresh air inlet side) of the intake manifold 67. The air discharge port (fresh air outlet) of the compressor 49b of the supercharger 49 is connected to the air inlet port (fresh air inlet) of the intercooler 51. A main throttle valve V1 is arranged between the compressor 49b and the intercooler 51, and the flow rate of air supplied to the intake manifold 67 is adjusted by adjusting the valve opening degree of the main throttle valve V1.

An air supply bypass flow path 17 for bypassing the compressor 49b couples the side of the air intake port (fresh air inlet) of the compressor 49b with the side of the air intake port of the intercooler 51. That is, the air supply bypass flow path 17 is opened to the outside on an upstream side with respect to the side of the air intake port of the compressor 49b, while connected to a connection portion between the intercooler 51 and the main throttle valve V1. An air supply bypass valve V2 is arranged on the air supply bypass flow path 17, and the opening degree of the air supply bypass valve V2 is adjusted, thereby adjusting the flow rate of the air flown from the downstream side of the main throttle valve V1 to the outside via the air supply bypass flow path 17.

As described above, the intake system of the engine device 21 includes the intake manifold 67, the intercooler 51, the main throttle valve V1, the compressor 49b, and the air supply bypass valve V2. In the intake system of the engine device 21, the intercooler 51, the main throttle valve V1, and the compressor 49b are arranged in order with respect to the upstream side of the flow of the air from the intake manifold 67. The air supply bypass valve V2 is provided on the air supply bypass flow path 17, which is a bypass path for bypassing the compressor 49b. The exhaust system of the engine device 21 includes the exhaust manifold 44 and the turbine 49a, and the turbine 49a is arranged with respect to the downstream side of the flow of the exhaust gas from the exhaust manifold 44.

As illustrated in FIG. 6, in the engine device 21, the cylinders 36 are installed in the cylinder block 25, and pistons 78 are slidably stored in the cylinders 36. The cylinder head 26 is arranged on the upper portion of the cylinder block 25, and an ignition device 79 is inserted into the cylinder head 26, and an intake valve 80 and an exhaust valve 81 are slidably installed on the outer circumferential side of the ignition device 79. Then, an auxiliary chamber S is formed on the lower end side of the ignition device 79, in the ignition device 79. Also, a spark plug 82 and a check valve 89 are inserted into the ignition device 79 in such a manner that each tip end is positioned above the auxiliary chamber S. The main chamber M that is surrounded with the lower side of the cylinder block 25 and the top portion of the piston 78 is formed in the cylinder 36.

That is, the cylindrical cylinder 36 is inserted into the cylinder block 25, and the piston 78 vertically reciprocates in the cylinder 36, thereby rotating the engine output shaft 24 on the lower side of the cylinder 36. The ignition devices 79 in which the spark plug 82 and the check valve 89 are loaded are respectively inserted into the cylinder heads 26 on the cylinder block 25 while the tip ends thereof are oriented to the cylinders 36. Regarding the ignition device 79, the tip end thereof is arranged at a central position on the upper end surface of the cylinder 36, and the check valve 89 is connected to the auxiliary fuel gas flow path 31. Accordingly, when the engine device 21 is driven, the fuel gas injected from the check valve 89 is ignited by a spark of spark plug 82 in the auxiliary chamber S of the ignition devices 79, and an ignition flame (combustion gas) is generated at the central position of the main chamber M in the cylinder 36.

The gas injectors 98 is arranged in the intake port 37, and a gas injection nozzle 103 of the gas injectors 98 is inserted into the air flow path in the intake port 37. Also, the gas injectors 98 is connected to the main fuel gas flow path 30. The fuel gas injected from the gas injection nozzle 103 is mixed with air flown from the intake manifold 67 in the air flow path in the intake port 37. Accordingly, when the intake valve 80 is opened, the premixed gas in which the fuel gas from the gas injectors 98 is mixed with the air from the intake manifold 67 is flown into the main chamber M.

In each cylinder head 26, the intake valve 80 is vertically moved, thereby opening/closing the intake port 37, and the exhaust valve 81 is vertically moved, thereby opening/closing the exhaust port 38. That is, the intake valve 80 is opened, the air from the intake manifold 67 through the intake port 37 is drawn into by a main combustion chamber in the cylinder 36, whereas when the exhaust valve 81 is opened, the combustion gas (exhaust gas) in the main combustion chamber in the cylinder 36 is discharged to the exhaust manifold 44 through the exhaust port 38. Accordingly, when the engine device 21 is driven, the ignition flame (combustion gas) by the ignition device 79 is generated, which causes the premixed gas, supplied to the main chamber M in the cylinder 36 via the intake valve 80, to react, thereby generating premixed combustion.

That is, when the engine device 21 is driven, the gas injectors 98 inject the fuel gas in the intake port 37. Accordingly, the fuel gas injected from the gas injectors 98 is mixed with the air flown from the intake manifold 67 in the intake port 37. Then, the mixed gas in which the fuel gas is mixed with the air flows to the intake valve 80 through the intake port 37. At this time, the intake valve 80 is opened, the mixed gas is drawn into the main chamber M in the cylinder 36. Then, after the intake valve 80 is closed, and the mixed gas in the main chamber M is compressed by sliding the pistons 78, the ignition flame is injected into the main chamber M by means of the ignition device 79, and the mixed gas is combusted in the main chamber M. Subsequently, the exhaust valve 81 is opened, the combustion gas (exhaust gas) in the main chamber M is discharged to the exhaust manifold 44 through the exhaust port 38 in the cylinder head 26.

A main fuel gas pressure sensor 112 for measuring the gas pressure of fuel gas and a main fuel gas temperature sensor 113 for measuring the gas temperature of the fuel gas in the flow path are installed in the main fuel gas flow path 30. The flow rate of the fuel gas supplied from the gas injector 98 to the intake port 37 is measured based on the measurement results of the main fuel gas pressure sensor 112. Also, the gas temperature of the fuel gas supplied from the gas injector 98 is measured with the main fuel gas temperature sensor 113. An auxiliary fuel gas pressure sensor 114 for measuring the gas pressure of the fuel gas in the flow path is installed in the auxiliary fuel gas flow path 31, and the flow rate of the fuel gas supplied to the check valve 89 is measured based on the measurement results of the auxiliary fuel gas pressure sensor 114.

As illustrated in FIG. 6, the engine device 21 includes an engine control device 73 for controlling each portion of the engine device 21, and the spark plug 82 and the gas injector 98 are provided for each cylinder 36. The engine control device 73 provides the spark plug 82 and the gas injector 98 with a control signal and controls the ignition of the spark plug 82 and the gas fuel supplied by the gas injector 98.

The engine control device 73 controls the main fuel gas pressure adjustor 110 and the auxiliary fuel gas pressure adjustor 111 and adjusts the gas pressure (gas flow rate) of the fuel gas supplied from the main fuel gas flow path 30 and the auxiliary fuel gas flow path 31. The engine control device 73 provides each of the main throttle valve V1 and the air supply bypass valve V2 with a control signal, adjusts respective valve opening degrees, and adjusts air pressure (intake manifold pressure) in the intake manifold 67.

The engine control device 73 receives measurement signals from load measurement devices (load detection sensors) 19 such as a watt transducer and a torque sensor and calculates load applied to the engine device 21. The engine control device 73 receives measurement signals from an engine revolution sensor 20 such as a pulse sensor for measuring the revolutions of a crankshaft 24 and detects the engine revolutions of the engine device 21. The engine control device 73 receives measurement signals from the intake manifold pressure sensor (pressure sensor) 39 for measuring air pressure in the intake manifold 67 and detects intake manifold pressure. The engine control device 73 receives measurement signals from a lubricating oil temperature sensor 115 and detects a lubricating oil temperature Tj of lubricating oil circulated in the engine device 21.

The engine control device 73 receives measurement signals from the main fuel gas pressure sensor 112 for detecting main fuel gas pressure Pm, the main fuel gas temperature sensor 113 for detecting a main fuel gas temperature Tm, and the auxiliary fuel gas pressure sensor 114 for detecting auxiliary fuel gas pressure Ps as an auxiliary chamber fuel flow rate. The engine control device 73 drivingly controls the main fuel gas pressure adjustor 110 and adjusts the flow rate of the main fuel gas supplied to the gas injector 98 of each intake port 37 based on respective measurement signals from the main fuel gas pressure sensor 112 and the main fuel gas temperature sensor 113. The engine control device 73 drivingly controls the auxiliary fuel gas pressure adjustor 111 and adjusts the flow rate of the auxiliary fuel gas supplied to the check valve 89 of each ignition device 79 based on the measurement signals from the auxiliary fuel gas pressure sensor 114.

The engine control device 73 adjusts the valve opening degree of the gas injector 98 and sets the flow rate of the fuel gas supplied into the main chamber M of each cylinder 36. Then, the engine control device 73 controls the ignition operation of the spark plug 82 and generates combustion in each cylinder 36 at a predetermined timing. That is, the gas injector 98 supplies the fuel gas, of which the flow rate is in accordance with the valve opening degree, to the intake port 37, and the fuel gas is mixed with the air from the intake manifold 67, and the premixed fuel is supplied to the cylinders 36. Then, an auxiliary fuel gas supplied from the check valve 89 is ignited by the spark plug 82 in the auxiliary chamber S of the ignition device 79 in synchronism with the injection timing of each cylinder 36. The combustion gas generated by the ignition device 79 is injected into the main chamber M and ignited in the cylinder 36 to which the premixed gas is supplied.

Next, the constitution of the external appearance of the gas engine device 21 (the engine device 21) will be described referring to FIGS. 7 to 9. In the description below, a side connected with the generator 23 is regarded as a rear side, and the positional relations of the right, left, front, and rear with regard to the constitution of the engine device 21 are defined.

Figure 7:
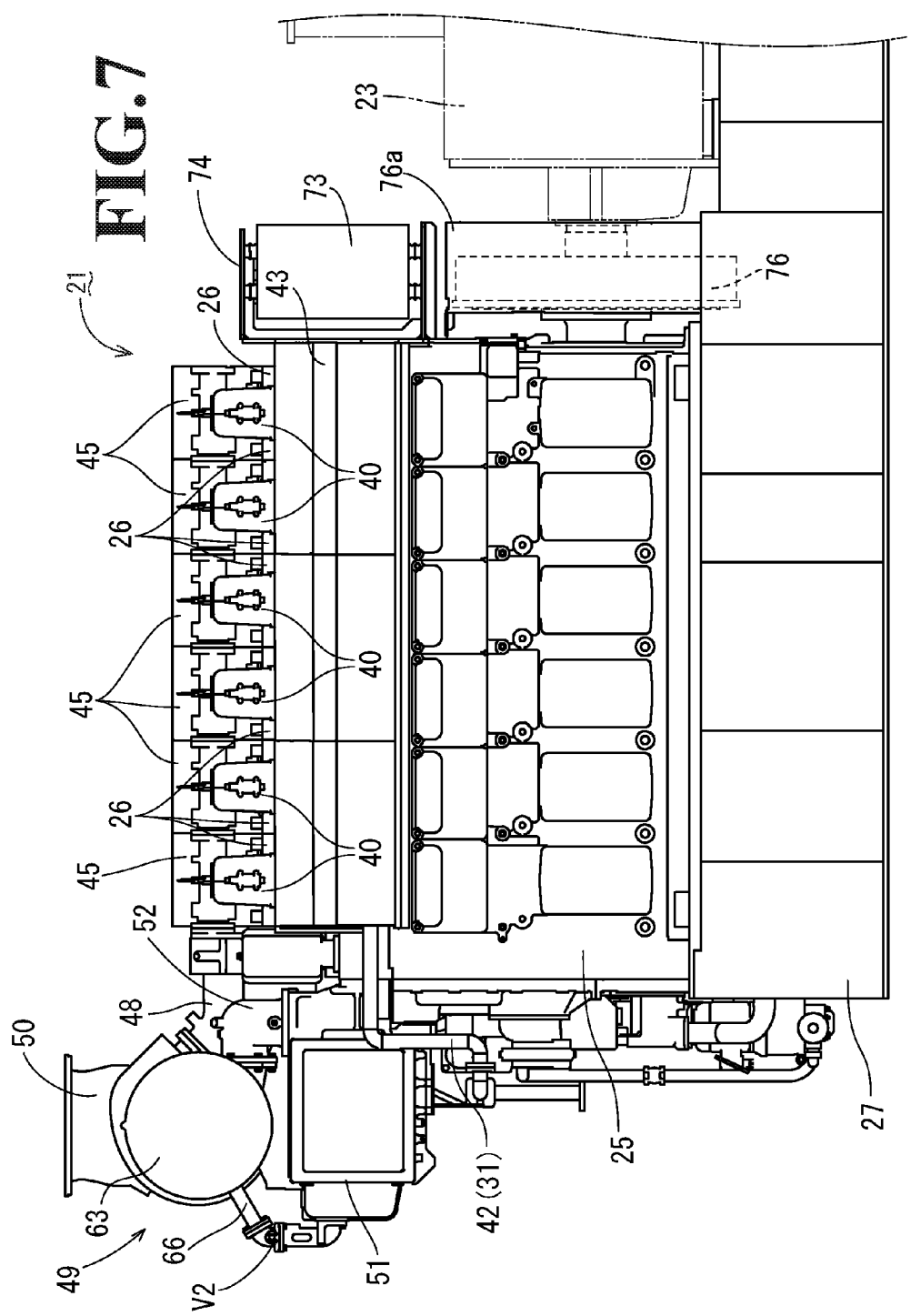
FIG. 7 is a side view of the engine device.
Figure 8:
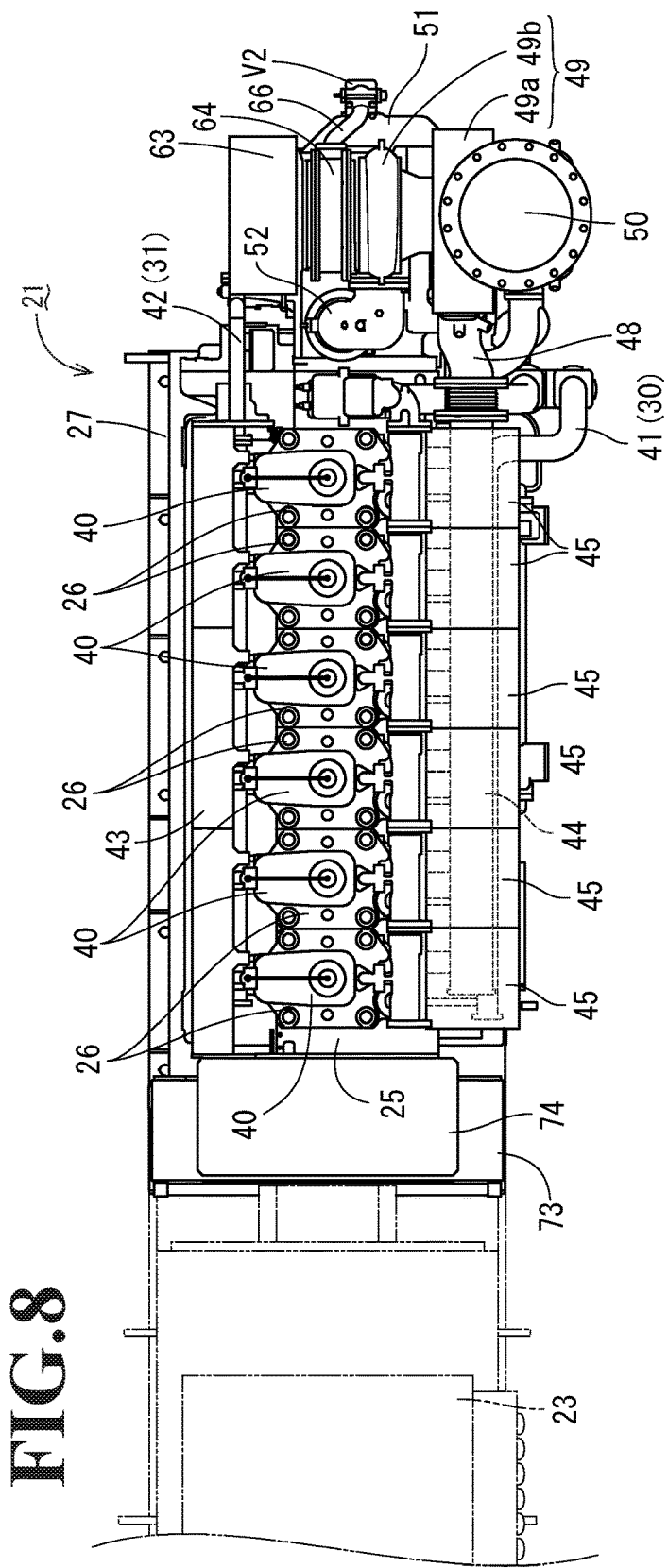
FIG. 8 is a plan view of the engine device.

As illustrated in FIGS. 7 and 8, the engine device 21 includes the engine output shaft 24 in the cylinder block 25 stationarily placed on a base stand 27, and the cylinder head 26 in which a plurality of head covers 40 are arranged back and forth in a row is placed on the cylinder block 25. In the engine device 21, a main fuel gas pipe 41, which is part of the main fuel gas flow path 30, is extended in parallel to the row of the head covers 40 on the right side surface of the cylinder head 26, while an auxiliary fuel gas pipe 42, which is part of the auxiliary fuel gas flow path 31, is extended in parallel to the row of the head covers 40 on the left surface side of the cylinder block 25.

On the upper side of the main fuel gas pipe 41, the exhaust manifold (exhaust flow path) 44 is extended in parallel to the row of the head covers 40, and the outer circumference of the exhaust manifold 44 is covered with a heat insulation cover 45. The heat insulation cover 45 is configured to cover the outer circumferential surface and the rear end of the exhaust manifold 44. An air layer formed between the heat insulation cover 45 and the exhaust manifold 44 functions as a heat insulation layer, so that influence on the surroundings, caused by waste heat from the exhaust manifold 44, can be reduced. Also, a side cover 43 for covering the auxiliary fuel gas pipe 42 is arranged on the left side surface of the cylinder block 25.

Figure 9:
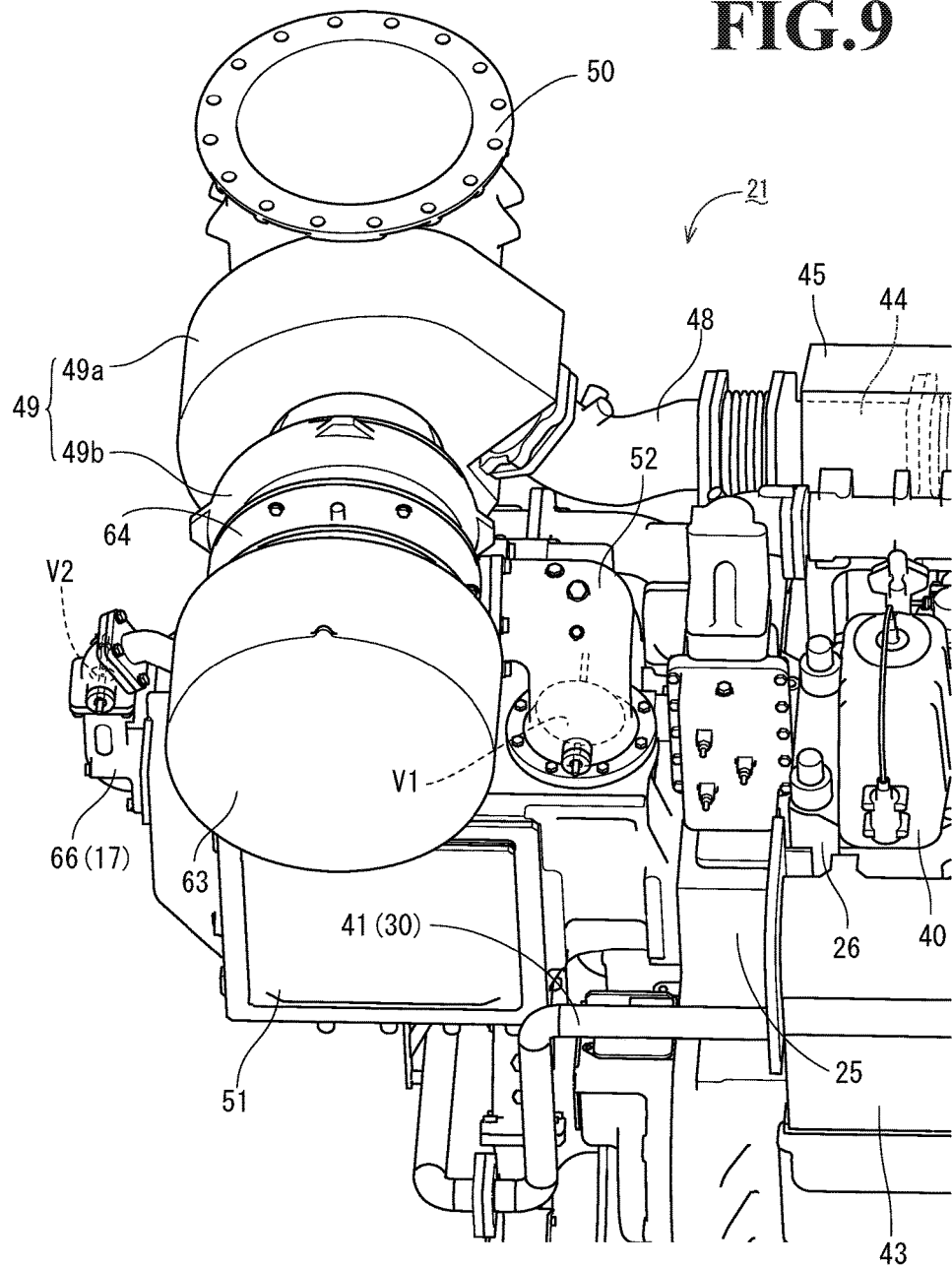
FIG. 9 is an enlarged perspective view of the engine device.

As illustrated in FIGS. 7 to 9, the front end (the exhaust outlet side) of the exhaust manifold 44 is connected to the supercharger 49 via an exhaust joining pipe 48. Accordingly, the exhaust gas discharged through the exhaust manifold 44 flows in the turbine 49a of the supercharger 49 via the exhaust joining pipe 48, thereby rotating the turbine 49a and rotating the compressor 49b, which is coaxially disposed with the turbine 49a. The supercharger 49 is arranged on the upper side of the front end of the engine device 21 and includes the turbine 49a on the right side thereof and the compressor 49b on the left side thereof. Then, an exhaust outlet pipe 50 is arranged on the right side of the supercharger 49 and coupled with the exhaust outlet of the turbine 49a, and the exhaust gas is discharged from the turbine 49a.

The intercooler 51 for cooling compressed air by means of the compressor 49b of the supercharger 49 is arranged on the lower side of the supercharger 49. That is, the intercooler 51 is installed on the front end side of the cylinder block 25, and the supercharger 49 is placed on the upper portion of the intercooler 51. The air discharge port of the compressor 49b is provided at right and left mid-depths of the supercharger 49 in such a manner so as to be opened to the rear (the side of the cylinder block 25). In contrast, an air intake port opened upward is provided on the upper surface of the intercooler 51, and the compressed air discharged from the compressor 49b through the air intake port flows in the interior of the intercooler 51. Then, the air discharge port of the compressor 49b communicates with the air intake port of the intercooler 51 through an air supply joining pipe 52 whose one ends are connected to the ports. The main throttle valve V1 is pivotally supported in the interior of the air supply joining pipe 52.

The supercharger 49 pivotally supports the compressor 49b and the turbine 49a in a coaxial manner, which are allocated right and left and arranged, and the compressor 49b rotates based on the rotation of the turbine 49a introduced from the exhaust manifold 44 through the exhaust joining pipe 48. Also, the supercharger 49 includes an intake filter 63 for removing dust in the outside air to be introduced and a fresh air path pipe 64 for connecting the intake filter 63 with the compressor 49b, on the left side of the compressor 49b, which is serves as a fresh air intake side. Accordingly, the compressor 49b rotates in synchronism with the turbine 49a, so that the outside air (air) drawn in by the intake filter 63 is introduced into the compressor 49b through the supercharger 49. Then, the compressor 49b compresses the air drawn from the left side and discharges the compressed air to the air supply joining pipe 52 installed on the rear side.

The front of the upper portion of the air supply joining pipe 52 is opened and connected to the discharge port in rear of the compressor 49b, while the lower side thereof is opened and connected to the intake port on the upper surface of the intercooler 51. Also, the intercooler 51 is connected to one end of an air supply bypass pipe 66 (the air supply bypass flow path 17) at a branch port provided on the air path on the front surface, and part of the compressed air cooled with the intercooler 51 is discharged to the air supply bypass pipe 66. The other end of the air supply bypass pipe 66 is connected to the branch port provided on the front surface of the fresh air path pipe 64, and part of the compressed air cooled with the intercooler 51 is circulated in the fresh air path pipe 64 through the air supply bypass pipe 66 and merged with the outside air from the intake filter 63. Also, the air supply bypass pipe 66 pivotally supports the air supply bypass valve V2 on the midway portion thereof.

The intercooler 51 causes the compressed air from the compressor 49b to flow in from the rear on the left side through the air supply joining pipe 52, and cools the compressed air based on the heat exchange action of a coolant supplied from a water supply pipe 62. After the compressed air cooled in the left chamber in the interior of the intercooler 51 flows to the forward air path and is introduced in the right chamber, the compressed air is discharged to the intake manifold 67 (see FIG. 4) through the discharge port provided in rear of the right chamber.

Also, the turbine 49a of the supercharger 49 connects the intake port disposed rearward to the exhaust joining pipe 48 and connects the discharge port on the right side to the exhaust outlet pipe 50. Accordingly, the supercharger 49 introduces the exhaust gas from the exhaust manifold 44 to the interior of the turbine 49a via the exhaust joining pipe 48, causes the turbine 49a to rotate, and concurrently causes the compressor 49b to rotate, thereby discharging the exhaust gas from the exhaust outlet pipe 50. The rear of the exhaust joining pipe 48 is opened and connected to the discharge port of the exhaust manifold 44, while the front thereof is opened and connected to the intake port of the rear of the turbine 49a.

Also, the engine control device 73 for controlling the operation of each portion of the engine device 21 is fixed on the rear end surface of the cylinder block 25 via a support stay (support member) 74. A fly wheel 76 that is coupled with the generator 23 and rotated is installed on the rear end side of the cylinder block 25, and the engine control device 73 is arranged on the upper portion of a flywheel housing 76a that covers the flywheel 76. This engine control device 73 electrically connects to the sensors (pressure sensors or temperature sensors) of each portion of the engine device 21, collects temperature data or pressure date on each portion of the engine device 21, provides an electromagnetic valve of each portion of the engine device 21 or the like with a signal, and controls various operations (plug ignition, gas pressure adjustment, valve opening degree adjustment, gas injection, coolant temperature adjustment, and the like) of the engine device 21.

As described above, regarding the engine device 21 of the present embodiment, the main throttle valve V1 is provided at a connection section between the air exhaust port of the supercharger 49 and the inlet of the intercooler 51. Also, the engine device 21 includes an air supply bypass flow path 66 that connects the air inflow port of the supercharger 49 with the inlet of the intercooler 51, and the air supply bypass valve V2 is arranged on the air supply bypass flow path 66. The engine device 21 has structure in which the main throttle valve V1 and the air supply bypass valve V2 are provided, so that the flow rate of air in the intake manifold 67 can be controlled with high accuracy, and the flow rate of the air can be controlled with excellent responsiveness in response to variation in load. The air supply bypass flow path 66 functions as a buffer flow path with respect to the compressor 49b of the supercharger 49 and the intake manifold 67, so that a response speed, with which the flow rate of the air is optimally set in accordance with an increase or decrease in load, can be increased by controlling the opening degree of the air supply bypass valve V2.

When engine load is increased, the engine control device 73 executes the control of the opening degree of the air supply bypass valve V2, thereby setting the flow rate of the air supplied to the intake manifold 67. When the load is high, the bypass valve control is executed, thereby optimally controlling the flow rate of the air passing through the main throttle valve V1, so that the shortage of the flow rate of the air supplied to the intake manifold 67 can be prevented. Accordingly, the flow rate of the air can be controlled with excellent responsiveness with respect to a rapid increase in load, which makes it possible to provide an appropriate air-to-fuel ratio, and the operations of the engine device 21 can be stabilized.

When the engine load is decreased, the engine control device 73 executes the control of the opening degree of the air supply bypass valve V2, thereby setting the flow rate of the air supplied to the intake manifold 67. When control is made only based on the main throttle valve V1 in the case of low load, the flow rate of the air is rapidly reduced on the outlet side of the compressor 49b of the supercharger 49, which leads to surging in which the air moves backward in the compressor 49b. However, the air pressure in the inlet and outlet of the compressor 49b can be stabilized by simultaneously controlling the air supply bypass valve V2, and the occurrence of the surging can be prevented.

Also, regarding the engine device 21 of the present embodiment, when the engine load is in a low load area, the engine control device 73 executes the control of the opening degree with respect to the main throttle valve V1. In contrast, when the engine load is in a medium-to-high load area, the engine control device 73 sets a predetermined opening degree to the main throttle valve V1 and executes the control of the opening degree with respect to the air supply bypass valve V2. The bypass valve control with excellent responsiveness is executed in the medium-to-high load area on which variation in load exerts great influence, so that the severe deficiency of the flow rate of the air is suppressed in response to the variation on load, and the engine device 21 can be smoothly operated.

The details of the intake manifold pressure control by means of the engine control device 73 will be described below referring to a flowchart in FIG. 10.

Figure 10:
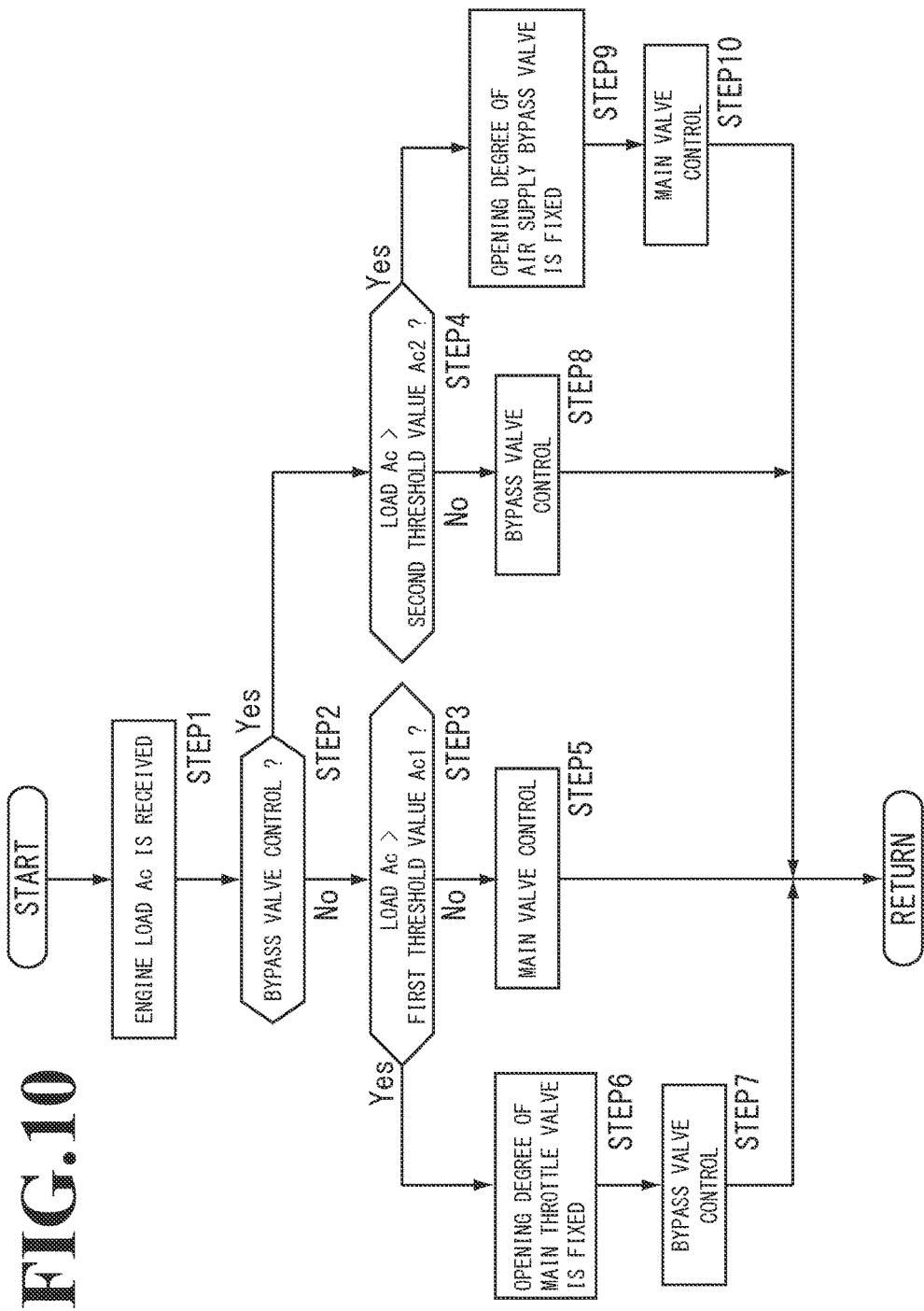
FIG. 10 is a flowchart illustrating the operation of the control of the flow rate of air in the engine device.

As illustrated in FIG. 10, when the engine control device 73 receives a measurement signal form a load measurement device (load detection sensor) 19 (STEP 1), the engine control device 73 verifies whether or not the control (bypass valve control) of the opening degree of the air supply bypass valve V2 is executed (STEP 2). When the bypass valve control is not executed (STEP 2, No), the engine control device 73 compares engine load Ac with predetermined load (first threshold value) Ac1 based on the measurement signal received at STEP 1 (STEP 3). In contrast, when the bypass valve control is executed (STEP 2, Yes), the engine control device 73 compares the engine load Ac with predetermined load (second threshold value) Ac2 (0<Ac2<Ac1) based on the measurement signal received at STEP 1 (STEP 4).

At STEP 3, when the engine load Ac is equal to or less than the predetermined load Ac1 (No), the engine control device 73 determines that the engine load Ac is in the low load area and performs feedback control (PID control) with respect to the valve opening degree of the main throttle valve V1 (STEP 5). In this time, the engine control device 73 sets a target value (target pressure) of intake manifold pressure in accordance with engine load. Then, the engine control device 73 receives a measurement signal from the pressure sensor 39, verifies a measurement value (measurement pressure) of the intake manifold pressure, and obtains a difference between the measurement pressure and the target pressure. Accordingly, the engine control device 73 performs the PID control of the valve opening degree of the main throttle valve V1 based on a differential value between the target pressure and the measurement pressure and brings the air pressure of the intake manifold 67 close to the target pressure. Hereinafter, the control of the valve opening degree of the main throttle valve V1 is referred to as "main valve control".

In contrast, at STEP 3, when the engine load Ac exceeds the predetermined load Ac1 (Yes), the engine control device 73 determines that the engine load Ac is in the medium-to-high load area and fixes the valve opening degree of the main throttle valve V1 to a predetermined opening degree (STEP 6). Then, the engine control device 73 performs the feedback control (PID control) with respect to the valve opening degree of the air supply bypass valve V2 (STEP 7). In this time, as is the same with the main valve control, the engine control device 73 receives a measurement signal from the pressure sensor 39, performs the PID control of the valve opening degree of the air supply bypass valve V2 based on a differential value between the target pressure and the measurement pressure, and brings the air pressure of the intake manifold 67 close to the target pressure.

That is, in the case where the engine load Ac increases, and when the engine load Ac exceeds the predetermined load Ac1, the engine control device 73 switches from the main valve control to the bypass valve control as the pressure control of the intake manifold pressure. Also, in the present embodiment, when the engine load Ac exceeds the predetermined load Ac1 during an increase in load, at STEP 4, the engine control device 73 fully opens the main throttle valve V1, controls the flow rate of the air in the air supply bypass flow path 17 based on the control of the opening degree of the air supply bypass valve V2, and adjusts the intake manifold pressure. In the medium-to-high load area on which variation in load exerts great influence, the severe deficiency of the flow rate of the air is suppressed with respect to the variation on load so as to execute the bypass valve control with excellent responsiveness, and an optimal air-to-fuel ratio can be set.

At STEP 4, when the engine load Ac is equal to or higher than the predetermined load Ac2 (No), the engine control device 73 determines that the engine load Ac is in the medium-to-high load area and continues to perform the feedback control (the bypass valve control) with respect to the valve opening degree of the air supply bypass valve V2 (STEP 8). In contrast, at STEP 4, when the engine load Ac falls below the predetermined load Ac2 (Yes), the engine control device 73 determines that the engine load Ac is in the low load area and fixes the valve opening degree of the air supply bypass valve V2 to a predetermined opening degree (STEP 9). Then, the engine control device 73 performs the feedback control (the main valve control) with respect to the valve opening degree of the main throttle valve V1 (STEP 10).

That is, in the case where engine load L decreases, and when the engine load L falls below the predetermined load Ac2 that is higher than the predetermined load Ac1, the engine control device 73 switches from the main valve control to the bypass valve control as the pressure control of the intake manifold pressure. Thus, with regard to the switching of the pressure control of the intake manifold pressure, hysteresis is added to respective threshold values during an increase in load and during an decrease in load, thereby smoothly executing the switching operations.

Figure 11:
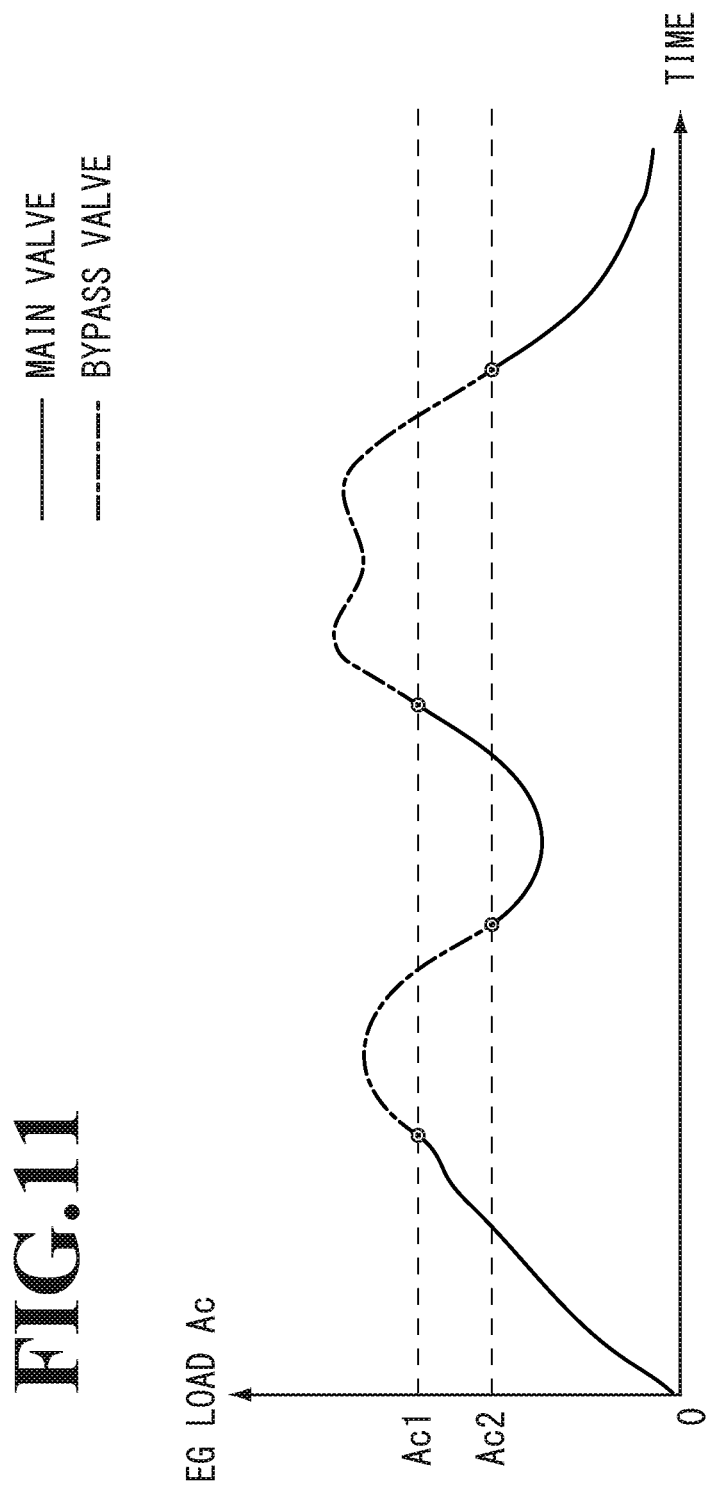
FIG. 11 is a time chart illustrating the operation of the control of the flow rate of air in the engine device.

As illustrated in FIG. 11, regarding the engine device 21 of the present embodiment, in the case where the engine load Ac increases, and when the engine load Ac is lower than the first threshold value Ac1, the engine control device 73 executes the control of the opening degree of the main throttle valve V1, and when the engine load Ac exceeds the first threshold value Ac1, the engine control device 73 switches from the control of the opening degree of the main throttle valve V1 to the control of the opening degree of the air supply bypass valve V2. In contrast, in the case where the engine load Ac decreases, and when the engine load Ac is equal to or higher than the second threshold value Ac2 that is lower than the first threshold value Ac1, the engine control device 73 executes the control of the opening degree of the air supply bypass valve V2, and when the engine load Ac falls below the second threshold value Ac2, the engine control device 73 switches from the control of the opening degree of the air supply bypass valve V2 to the control of the opening degree of the main throttle valve V1.

Provided is structure in which the main throttle valve V1 and the air supply bypass valve V2 are included, thereby controlling the flow rate of the air in the intake manifold 67 with high accuracy, so that the flow rate of the air can be controlled with excellent responsiveness in response to the variation on load. Also, in the high load area on which variation in load exerts great influence, the bypass valve control with excellent responsiveness is executed, so that the severe deficiency of the flow rate of the air with respect to the variation on load is unlikely to occur, which leads to stable operations. Furthermore, hysteresis is provided for the threshold values for the purpose of the switching of control, thereby smoothly executing the switching of control.

Figure 12:
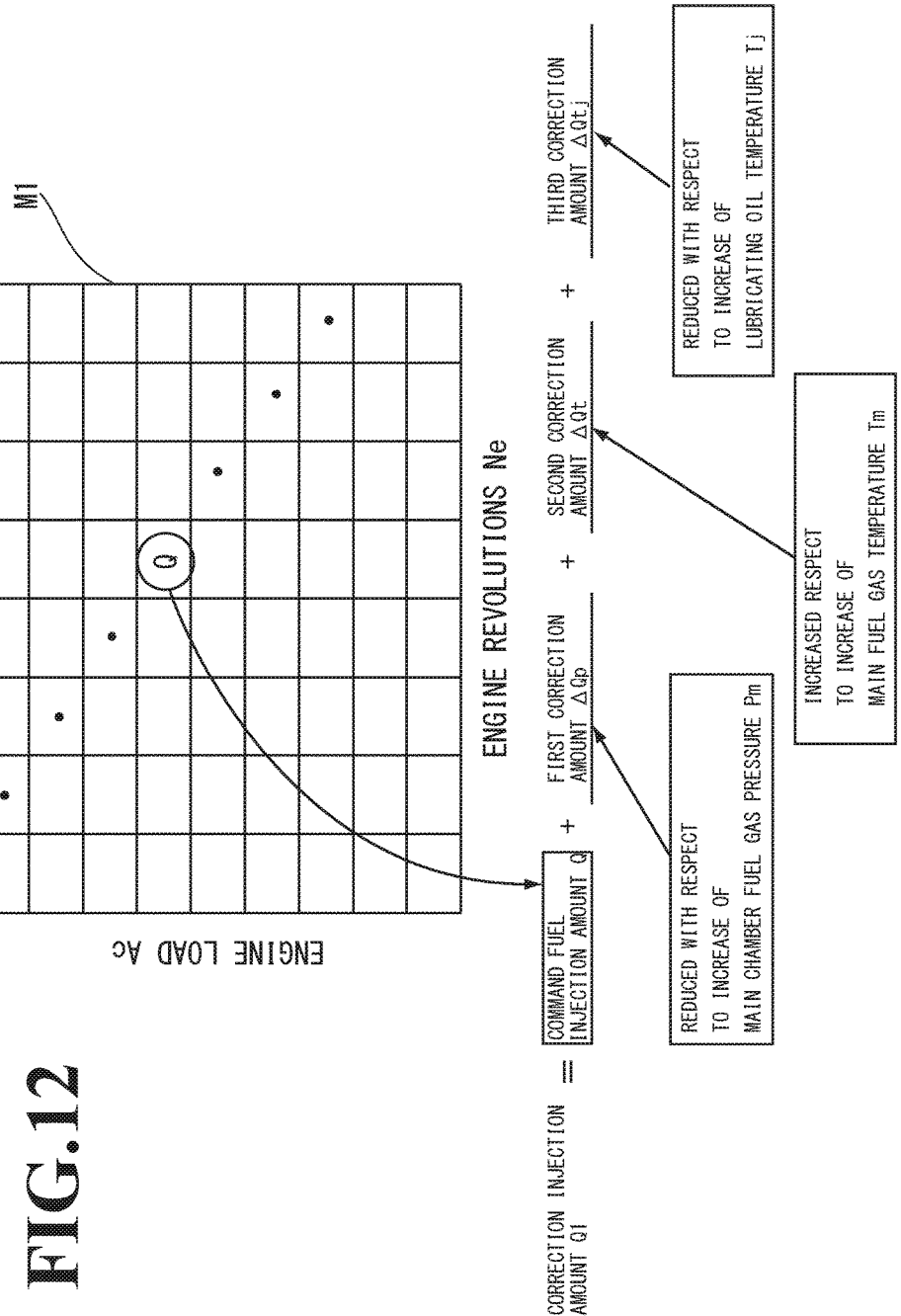
FIG. 12 is a schematic view illustrating the operation of the control of the injection amount of fuel gas.

Next, the control of a fuel injection amount (main fuel gas injection amount) by means of the engine control device 73 will be described below. As illustrated in FIG. 12, the engine control device 73 stores a fuel injection amount map M1 and determines the flow rate of the main fuel gas injected from the gas injector 98 based on the fuel injection amount map M1. It is noted that the fuel injection amount map M1 represents correlation between engine revolutions Ne, the engine load Ac, and a command fuel injection amount Q as the fuel flow rate and is used to determine the command fuel injection amount Q with respect to the engine revolutions Ne and the engine load Ac.

When the engine control device 73 receives the engine load Ac measured by the load measurement device (load detection sensor) 19 and the engine revolutions Ne measured by the engine revolution sensor 20, the engine control device 73 refers to the fuel injection amount map M1 and determines the command fuel injection amount Q. Then, the engine control device 73 executes correction calculations based on a first correction amount $\Delta Qp$ according to the main fuel gas pressure Pm, a second correction amount $\Delta Qt$ according to the main fuel gas temperature Tm, or a third correction amount $\Delta Qtj$ according to the lubricating oil temperature Tj with respect to the command fuel injection amount Q determined and calculates a correction injection amount Q1. Accordingly, the flow rate is controlled in such a manner that the flow rate of the main fuel gas injected from the gas injector 98 corresponds to the correction injection amount Q1 determined by the engine control device 73.

In the engine device 21, when the main fuel gas pressure Pm increases, the density of the main fuel gas increases, and the fuel injection amount required to correspond to the same engine load Ac at predetermined engine revolutions Ne is reduced. Accordingly, when the engine control device 73 receives the main fuel gas pressure Pm measured by the main fuel gas pressure sensor 112, the engine control device 73 reduces the command fuel injection amount Q based on the first correction amount $\Delta Qp$ in proportion to an increase in the main fuel gas pressure Pm and calculates the correction injection amount Q1, with regard to the correction calculations so as to calculate the correction injection amount Q1. That is, the first correction amount $\Delta Qp$ is a correction amount that is reduced in proportion to an increase in the main fuel gas pressure Pm.

In the engine device 21, when the main fuel gas temperature Tm increases, the density of the main fuel gas is reduced, the fuel injection amount required to correspond to the same engine load Ac at predetermined engine revolutions Ne is increased. Accordingly, when the engine control device 73 receives the main fuel gas temperature Tm measured by the main fuel gas temperature sensor 113, the engine control device 73 increases the command fuel injection amount Q based on the second correction amount $\Delta Qt$ in proportion to an increase in the main fuel gas temperature Tm and calculates the correction injection amount Q1, with regard to the correction calculations so as to calculate the correction injection amount Q1. That is, the second correction amount $\Delta Qt$ is an correction amount that is increased in proportion to an increase in the main fuel gas temperature Tm.

In the engine device 21, when the lubricating oil temperature Tj increases, the viscosity of the lubricating oil is reduced, and the fuel injection amount required to correspond to the same engine load Ac at predetermined engine revolutions Ne is reduced. Accordingly, when the engine control device 73 receives the lubricating oil temperature Tj measured by a lubricating oil temperature sensor 115, the engine control device 73 reduces the command fuel injection amount Q based on the third correction amount $\Delta Qtj$ in proportion to an increase in the lubricating oil temperature Tj and calculates the correction injection amount Q1, with regard to the correction calculations so as to calculate the correction injection amount Q1. That is, the third correction amount $\Delta Qtj$ is an correction amount that is reduced in proportion to an increase in the lubricating oil temperature Tj.

When the engine control device 73 executes the aforementioned main valve control or the aforementioned bypass valve control, the engine control device 73 sets a target value (target pressure) Pim of the intake manifold pressure in accordance with the engine load. In this time, the engine control device 73 refers to a target intake manifold pressure map M2 stored and determines the target pressure Pim. The target intake manifold pressure map M2 represents correlation between the engine revolutions Ne, the engine load Ac, and the target pressure Pim and is used to determine the target pressure Pim with respect to the engine revolutions Ne and the engine load Ac.

Figure 13:
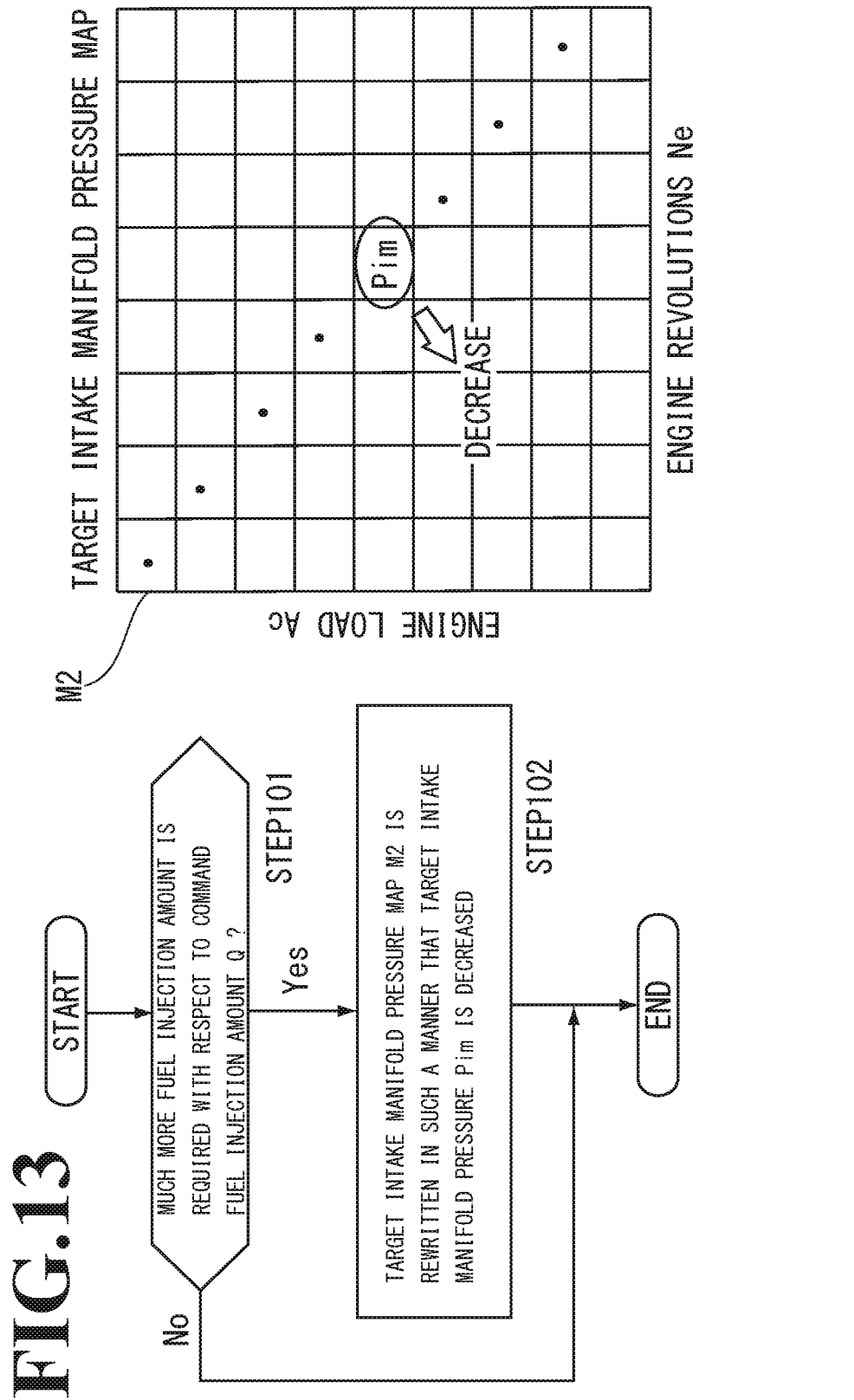
FIG. 13 is a flowchart illustrating the operation of the correction control of a target intake manifold pressure map.

Also, as illustrated in FIG. 13, when a fuel injection amount that is equal to or higher than the determined fuel injection amount is required, the engine control device 73 rewrites the stored content of the target intake manifold pressure map M2. That is, the engine control device 73 determines whether or not the fuel injection amount from the gas injector 98 is deficient based on the engine load Ac measured by the load measurement device 19 and the engine revolutions Ne measured by the engine revolution sensor 20 (STEP 101). Then, when the engine control device 73 determines that the fuel injection amount from the gas injector 98 is deficient (STEP 101, Yes), the engine control device 73 corrects (rewrites) the target pressure Pim in the target intake manifold pressure map M2 in such a manner as to be reduced and stores the target pressure Pim (STEP 102).

The case where the fuel injection amount from the gas injector 98 is required more than the fuel injection amount set, for example, means that target engine revolutions Nem are not obtained based on the fuel injection amount set with respect to the engine load Ac, or that a fuel injection amount is required more than the fuel injection amount Q calculated based on the fuel injection amount map with respect to the predetermined engine revolutions Ne and the predetermined engine load Ac.

In these cases, the engine control device 73 rewrites the stored elements in the target intake manifold pressure map M2 in such a manner that the target pressure Pim in the target intake manifold pressure map M2 is reduced. Accordingly, even when the fuel injection amount is deficient, the intake manifold pressure with respect to the predetermined engine revolutions Ne and the predetermined engine load Ac is reduced, thereby achieving an air-to-fuel ratio at which necessary combustion effects can be obtained. That is, when fuel gas having different composition is supplied to the engine device 21, the fuel injection amount is required more than usual because the calorific value of the fuel gas having different composition is low. In this time, the target pressure Pim is corrected in such a manner as to be reduced, thereby achieving an appropriate excess air ratio and preventing the deterioration of fuel consumption.

Figure 14:
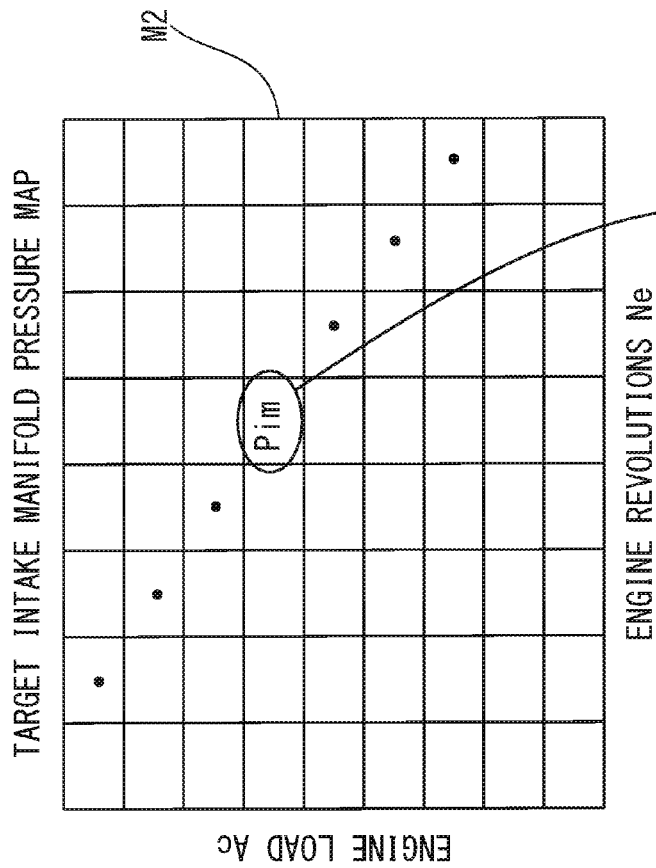
FIG. 14 is a schematic view illustrating the operation of the correction control of the target intake manifold pressure map.

Also, as illustrated in FIG. 14, the engine control device 73 executes correction calculation with respect to the target pressure Pim determined based on the target intake manifold pressure map M2 by use of a correction amount ΔPtj based on the lubricating oil temperature Tj and calculates correction target pressure Pim1. Accordingly, the engine control device 73 executes the PID control with respect to the opening degree of the main throttle valve V1 or the air supply bypass valve V2 based on a difference between the measurement pressure from the pressure sensor 39 and the correction target pressure Pim1.

In the engine device 21, when the lubricating oil temperature Tj increases, the excess air ratio is shifted to a rich side in a cold state (a state where the lubricating oil temperature Tj is low), and therefore there is a risk that combustion becomes unstable, and governing control cannot be performed, which leads to engine stalling. Accordingly, when the engine control device 73 receives the lubricating oil temperature Tj measured by a lubricating oil temperature sensor 115, the engine control device 73 increases the target pressure Pim based on the correction amount ΔPtj in proportion to the reduction in the lubricating oil temperature Tj and calculates the correction target pressure Pim1, regarding the correction calculations so as to calculate the correction target pressure Pim1. The pressure control of the intake manifold 67 is executed based on the correction target pressure Pim1, so that an appropriate excess air ratio can be maintained even in a cold state.

When the engine control device 73 executes the aforementioned main valve control or the aforementioned bypass valve control, the engine control device 73 sets the target value (target pressure) Pim of the intake manifold pressure in accordance with the engine load. In this time, the engine control device 73 refers to the target intake manifold pressure map M2 stored and determines the target pressure Pim. The target intake manifold pressure map M2 represents correlation between the engine revolutions Ne, the engine load Ac, and the target pressure Pim and is used to determine the target pressure Pim with respect to the engine revolutions Ne and the engine load Ac.

Figure 15:
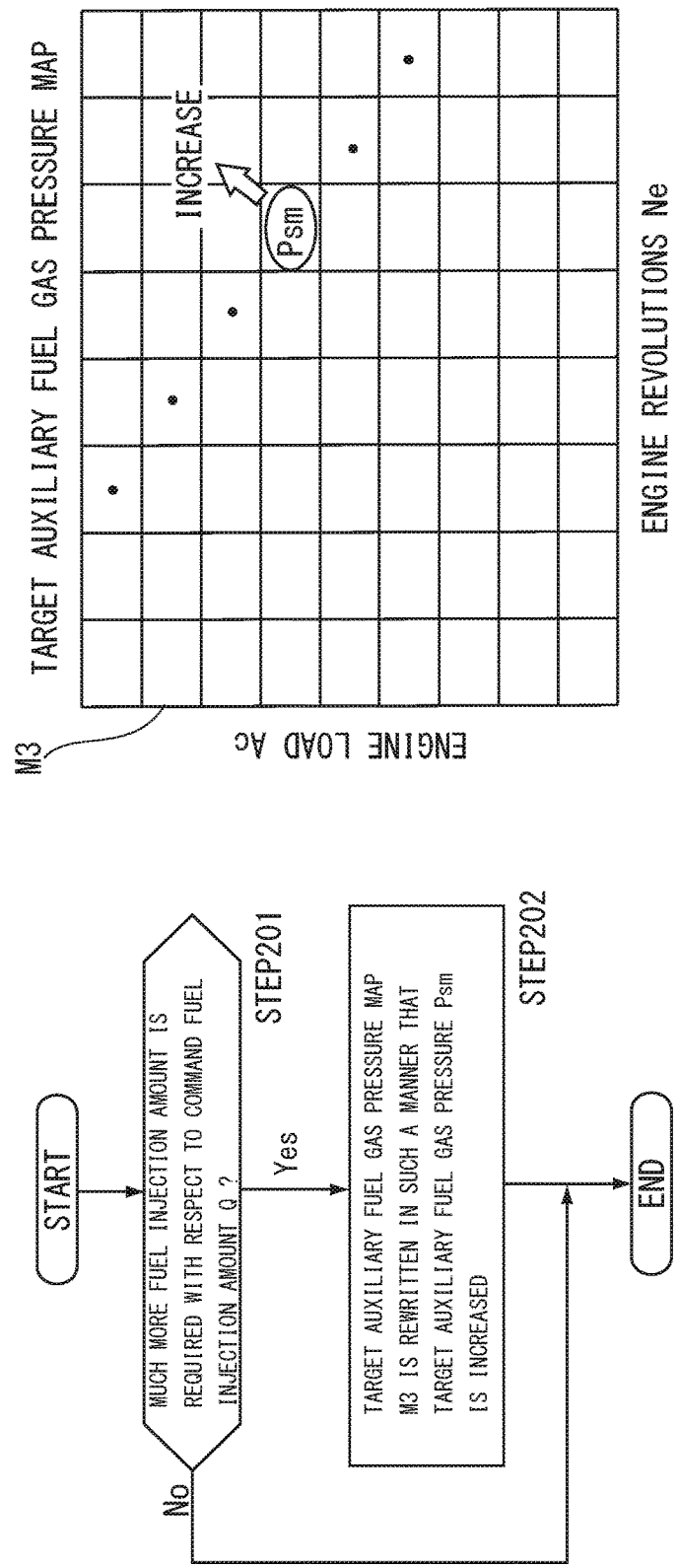
FIG. 15 is a flowchart illustrating the operation of the correction control of a target auxiliary fuel gas pressure map.

As illustrated in FIG. 15, when the engine control device 73 receives the engine load Ac measured by the load measurement device 19 and the engine revolutions Ne measured by the engine revolution sensor 20, the engine control device 73 refers to a target auxiliary fuel gas pressure map M3 and determines target auxiliary fuel gas pressure Psm. The target auxiliary fuel gas pressure map M3 represents correlation between the engine revolutions Ne, the engine load Ac, and the target auxiliary fuel gas pressure Psm and is used to determine the target auxiliary fuel gas pressure Psm with respect to the engine revolutions Ne and the engine load Ac.

Also, as illustrated in FIG. 15, in the case where a fuel injection amount is required equal to or more than the fuel injection amount that has been determined, the engine control device 73 rewrites the stored contents in the target auxiliary fuel gas pressure map M3. That is, as is the same with STEP 101 in FIG. 13, the engine control device 73 determines whether or not the fuel injection amount from the gas injector 98 is deficient based on the engine load Ac measured by the load measurement device 19 and the engine revolutions Ne measured by the engine revolution sensor 20 (STEP 201). Then, when the engine control device 73 determines that the fuel injection amount from the gas injector 98 is deficient (STEP 201, Yes), the engine control device 73 corrects (rewrites) the target auxiliary fuel gas pressure Psm in the target auxiliary fuel gas pressure map M3 in such a manner as to be increased and stores the target auxiliary fuel gas pressure Psm (STEP 202).

When the engine control device 73 determines that the fuel injection amount from the gas injector 98 is deficient, the engine control device 73 corrects the target auxiliary fuel gas pressure Psm in such a manner as to be increased. That is, when fuel gas having different composition is supplied to the engine device 21, the fuel injection amount is required more than usual because the calorific value of the fuel gas having different composition is low. In this time, the target auxiliary fuel gas pressure Psm is corrected in such a manner as to be increased, thereby achieving an appropriate excess air ratio and preventing the deterioration of fuel consumption.

Figure 16:
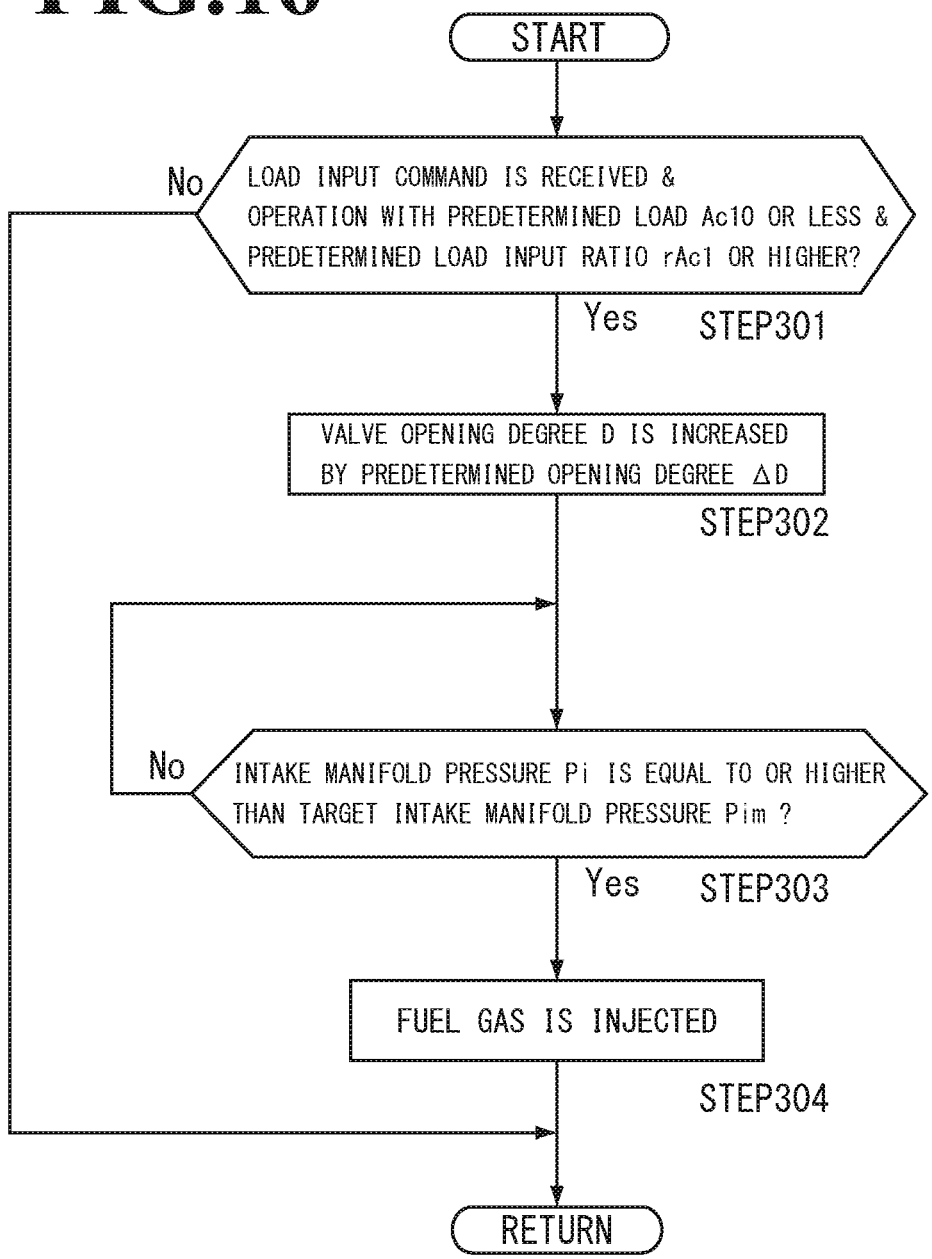
FIG. 16 is a flowchart illustrating the operation of the control by means of an engine control device when load is applied.

When the engine control device 73 transfers from a low-load operating state to a high-load operating state, the engine control device 73 increases the fuel injection amount from the gas injector 98 after the intake manifold pressure of the intake manifold 67 has reached the target pressure Pim. Hereinafter, a case where the engine control device 73 executes the control (the main valve control) of the opening degree of the main throttle valve V1 with low load being applied is exemplified, and the operation of control will be described. FIG. 16 is a flowchart illustrating the operation of the control by means of the engine control device 73 when load is applied, and FIG. 17 is a time chart illustrating the operation of the control by means of the engine control device 73 when load is applied.

As illustrated in FIG. 16, the engine control device 73 verifies that the engine load Ac measured by the load measurement device 19 is equal to or less than the predetermined load Ac10 during operation and that a load input command from the outside is received, and the load input commanded is equal to or higher than a predetermined load input ratio rAc1 (STEP 301). It is noted that the load input ratio rAc is a ratio of load applied to engine rated load. Also, the load input command, for example, is inputted to the engine control device 73 by means of an accelerator lever and the like.

When the engine control device 73 verifies that the conditions of STEP 301 are established (Yes), the engine control device 73 increases the opening degree D of the main throttle valve V1 only by a predetermined opening degree ΔD (STEP 302). It is noted that the engine control device 73 determines the predetermined opening degree ΔD based on the engine revolutions Ne measured by the engine revolution sensor 20 and a load input ratio rAc inputted from the outside. Then, the engine control device 73 verifies whether or not the intake manifold pressure (measurement pressure) Pi measured by the pressure sensor 39 is equal to or higher than the target intake manifold pressure (target pressure) Pim (STEP 303).

At STEP 303, when the measurement pressure Pi is equal to or higher than the target pressure Pim (Yes), the engine control device 73 increases the fuel injection amount from the gas injector 98 and injects fuel (STEP 304). Actually, the load is applied, and the engine revolutions Ne is reduced, which leads to an increase in the injection amount of main fuel gas from the gas injector 98. It is noted that, at STEP 302, after the opening degree D of the main throttle valve V1 is increased only by a predetermined opening degree ΔD, waiting may be applied only for a predetermined period of time, in place of the operation of the control at STEP 303 in which the state of the measurement pressure Pi is verified.

The engine control device 73 controls each portion in accordance with the flowchart in FIG. 16, and as illustrated in the time chart in FIG. 17, when the load input command is inputted from the outside, by means of the accelerator lever and the like, first, the engine control device 73 increases the opening degree of the main throttle valve V1 only by ΔD. Then, when the engine control device 73 verifies that the intake manifold pressure Pi has reached the target intake manifold pressure Pim after the execution of the main valve control, the engine control device 73 increases the injection amount Q of main fuel gas from the gas injector 98.

It is noted that the example in which the pressure of the intake manifold 67 is adjusted based on the main valve control at the time of inputting load has been described so as to simplify the description. However, even in the case where the main throttle valve V1 or the air supply bypass valve V2 is controlled so as to adjust the pressure of the intake manifold 67, it may be such that after the load input command is received, and the measurement pressure becomes equal to or higher than the target pressure, and then the injection amount of fuel from the gas injector 98 is increased.

Figure 18:
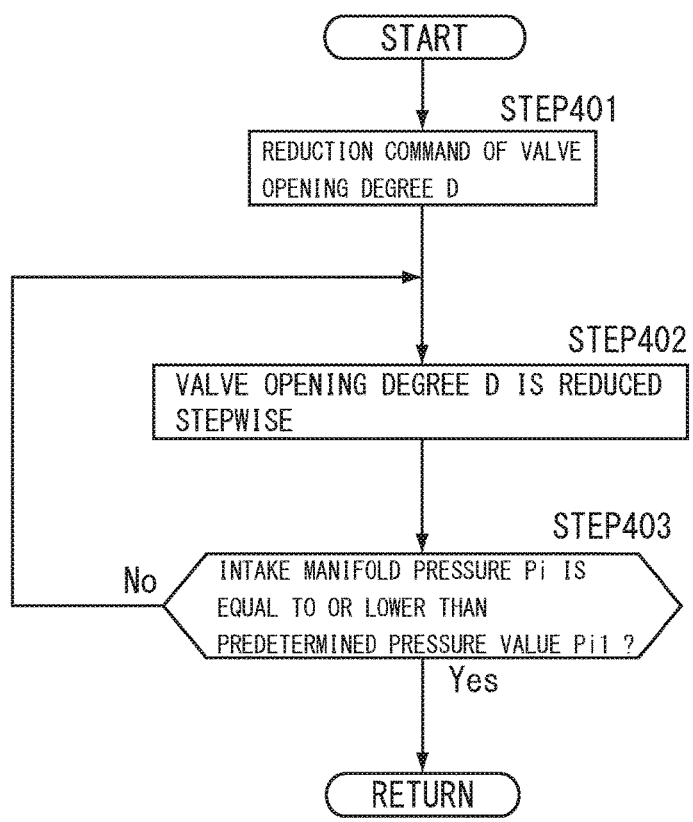
FIG. 18 is a flowchart illustrating the operation of the control of the opening degree of a main throttle valve when the load is reduced.

When the engine control device 73 reduces the load and closes the opening degree of the main throttle valve V1, the engine control device 73 executes the control of the opening degree of the main throttle valve V1 in such a manner as to close the opening degree of the main throttle valve V1 in a stepwise manner. FIG. 18 is a flowchart illustrating the operation of the control of the opening degree of the main throttle valve V1 by means of the engine control device 73, and FIG. 19 is a time chart illustrating the operation of the control by means of the engine control device 73 when load is reduced.

As illustrated in FIG. 18, when the engine control device 73 receives the load input command, with which the opening degree D of the main throttle valve V1 is reduced to a target opening degree Dm during the main valve control (STEP 401), the engine control device 73 reduces the opening degree D of the main throttle valve V1 to the target opening degree Dm in a stepwise manner (STEP 402). For example, reducing the opening degree D of the main throttle valve V1 in a stepwise manner means that the opening degree D is reduced at the velocity of 10%/s. It is noted that the velocity of 10%/s in the aforementioned example means velocity such that, when it is assumed that the opening degree is fully opened as 100% in one second, the opening degree D is reduced only by 10% of the opening degree of full openness. Also, at STEP 401, for example, the load is reduced by the accelerator lever, and the engine control device 73 receives the load input command.

When the engine control device 73 reduces the opening degree D of the main throttle valve V1 in a stepwise manner, the engine control device 73 verifies whether or not the intake manifold pressure (measurement pressure) Pi measured by the pressure sensor 39 is equal to or lower than a predetermined pressure value Pi1 (STEP 403). Then, the engine control device 73 verifies that the measurement pressure Pi of the intake manifold 67 is reduced to the predetermined pressure value Pi1 (STEP 403, Yes), the engine control device 73 completes the control of the opening degree of the main throttle valve V1.

The engine control device 73 controls each portion in accordance with the flowchart in FIG. 18, and as illustrated in the time chart in FIG. 19, when a load reduction command is inputted from the outside, by means of the accelerator lever and the like, first, the engine control device 73 closes the opening degree of the main throttle valve V1 in a stepwise manner. Then, when the engine control device 73 verifies that the intake manifold pressure Pi is gradually reduced and reaches the predetermined pressure value Pi1, the engine control device 73 fixes the opening degree of the main throttle valve V1 and completes the control of the opening degree of the main throttle valve V1. Thus, the opening degree of the main throttle valve V1 is gradually closed when load is reduced, which reduces the flow rate of the air passing through the compressor 49b in a stepwise manner, so that the occurrence of the surging in the supercharger 49 can be prevented.

Additionally, the constitution of each portion is not limited to the embodiments illustrated, but can be varied without departing from the scope of the gist of the present invention. Also, the engine device of the present embodiment constitutes the driving source of a generator device that supplies electric power to an electric system in the hull or the driving source in power generation facilities on land and can be applied to other constitution, besides the aforementioned propulsion-cum-power-generation mechanism.

What is claimed is:

1. An engine device comprising:
   an intake manifold configured to supply air to a cylinder;
   an exhaust manifold configured to discharge exhaust gas from the cylinder;
   a gas injector configured to mix the air supplied from the intake manifold with fuel gas;
   a supercharger configured to compress the air by means of the exhaust gas from the exhaust manifold;
   an intercooler configured to cool the compressed air compressed by the supercharger and supply the compressed air to the intake manifold;
   a main throttle valve interposed between an air discharge port of the supercharger and an inlet of the intercooler;
   an air supply bypass flow path configured to connect the air inflow port of the supercharger with the inlet of the intercooler;
   a bypass valve arranged in the air supply bypass flow path;
   a pressure sensor configured to measure air pressure in the intake manifold;
   a load detection sensor configured to detect the load of the engine; and
   an engine control device configured to control respective opening degrees of the main throttle valve and the bypass valve, wherein only the main throttle valve and the bypass valve are disposed so as to adjust flow rate of air into the intake manifold;
   wherein the engine control device is configured so that when load of the engine is lower than a predetermined threshold value, the engine control device controls an opening degree of the main throttle valve to adjust the flow rate of air into the intake manifold in accordance with load of the engine; and
   wherein the engine control device is also configured so that when the load of the engine is equal to or higher than the predetermined threshold value, the engine control device sets the main throttle valve to a predetermined opening degree and controls an opening degree of the bypass valve to adjust the flow rate of air into the intake manifold in accordance with the load of the engine; and
   wherein the engine control device is configured to set the opening degree of the main throttle valve or the bypass valve based on a difference between target air pressure based on the engine load detected by the load detection sensor and measurement pressure detected by the pressure sensor.

2. The engine device according to claim 1, further comprising an engine revolution sensor configured to measure revolutions of the engine,
wherein the engine control device is configured to set a fuel injection amount from the gas injector based on the engine revolutions detected by the engine revolution sensor and set the opening degree of the main throttle valve or the bypass valve based on the fuel injection amount set and an air-to-fuel ratio determined based on the engine load.

* * * * *